(12) United States Patent
Sakai

(10) Patent No.: US 10,834,361 B2
(45) Date of Patent: Nov. 10, 2020

(54) INFORMATION PROCESSING APPARATUS, INFORMATION PROCESSING METHOD, AND RECORDING MEDIUM

(71) Applicant: Sony Corporation, Tokyo (JP)

(72) Inventor: Yusuke Sakai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/483,751

(22) PCT Filed: Feb. 2, 2018

(86) PCT No.: PCT/JP2018/003673
§ 371 (c)(1),
(2) Date: Aug. 6, 2019

(87) PCT Pub. No.: WO2018/193687
PCT Pub. Date: Oct. 25, 2018

(65) Prior Publication Data
US 2020/0195889 A1 Jun. 18, 2020

(30) Foreign Application Priority Data
Apr. 18, 2017 (JP) ................................ 2017-082062

(51) Int. Cl.
*H04N 7/15* (2006.01)
*H04N 7/14* (2006.01)
(52) U.S. Cl.
CPC ............ *H04N 7/157* (2013.01); *H04N 7/147* (2013.01); *H04N 7/152* (2013.01)

(58) Field of Classification Search
USPC .......................................... 348/14.01, 14.09
See application file for complete search history.

(56) References Cited

U.S. PATENT DOCUMENTS

| 8,667,402 | B2 * | 3/2014 | Goldman | G06F 3/04815 |
| | | | | 709/224 |
| 2008/0298571 | A1 * | 12/2008 | Kurtz | H04N 7/142 |
| | | | | 379/156 |
| 2010/0080374 | A1 * | 4/2010 | Hepworth | H04M 3/568 |
| | | | | 379/202.01 |

(Continued)

FOREIGN PATENT DOCUMENTS

| JP | 2006-140747 A | 6/2006 |
| JP | 4645355 B2 | 3/2011 |
| JP | 2015-12369 A | 1/2015 |

*Primary Examiner* — Maria El-Zoobi
(74) *Attorney, Agent, or Firm* — Xsensus LLP

(57) ABSTRACT

To provide a mechanism capable of realizing more comfortable communication by connecting spaces to each other while permitting asymmetry.
There is provided an information processing apparatus including: a determination unit that determines adjustment parameters of space information asymmetrically with respect to bidirectional disclosure between a plurality of users communicating with each other on the basis of disclosure settings of the space information regarding each of the plurality of users; and an output control unit that outputs output information to the user, the output information including the space information regarding a user of a communication counterpart processed on the basis of the adjustment parameters and information indicating determination reasons of the adjustment parameters.

20 Claims, 19 Drawing Sheets

(56) References Cited

U.S. PATENT DOCUMENTS

2014/0368604 A1* 12/2014 Lalonde ................ H04N 7/147
              348/14.08
2018/0032997 A1*  2/2018 Gordon .............. G06Q 30/0269

* cited by examiner

INFORMATION PROCESSING APPARATUS, INFORMATION PROCESSING METHOD, AND RECORDING MEDIUM

CROSS-REFERENCE TO RELATED APPLICATIONS

The present application is based on PCT filing PCT/JP2018/003673, filed Feb. 2, 2018, which claims priority to JP 2017-082062, filed Apr. 18, 2017, the entire contents of each are incorporated herein by reference.

TECHNICAL FIELD

The present disclosure relates to an information processing apparatus, an information processing method, and a recording medium.

BACKGROUND ART

In recent years, with the development of a communication technology, a video telephone conference system in which conversation is performed through a video at remote locations has been proposed. Specifically, for example, a display device, a camera, a microphone, and a speaker are provided in each space, and video data captured and audio data collected in a certain space are output in real time from a display device and a speaker installed in another space.

With regard to such a bidirectional communication technology, for example, the following Patent Document 1 suggests a technology of determining a degree of request for communication between a user himself/herself and a communication counterpart on the basis of state information of the user and performing comfortable communication between the user himself/herself and the communication counterpart without inconvenience.

CITATION LIST

Patent Document

Patent Document 1: Japanese Patent No. 4645355

SUMMARY OF THE INVENTION

Problems to be Solved by the Invention

However, in the technology described in the above Patent Document 1, it is possible to connect spaces to each other while adjusting an information disclosure level depending on a connection request degree of each point, but the information disclosure levels of each point have merely been uniformly adjusted. Considering the fact that information that the user wants to see, the user does not want to see, the user wants to show a user of a communication counterpart, and the user does not want to show the user of the communication counterpart can be different between users, the uniform adjustment is not preferable.

Therefore, the present disclosure provides a mechanism capable of realizing more comfortable communication by connecting spaces to each other while permitting asymmetry.

Solutions to Problems

According to the present disclosure, there is provided an information processing apparatus including: a determination unit that determines adjustment parameters of space information asymmetrically with respect to bidirectional disclosure between a plurality of users communicating with each other on the basis of disclosure settings of the space information regarding each of the plurality of users; and an output control unit that outputs output information to the user, the output information including the space information regarding a user of a communication counterpart processed on the basis of the adjustment parameters and information indicating determination reasons of the adjustment parameters.

Furthermore, according to the present disclosure, there is provided an information processing method including: determining adjustment parameters of space information asymmetrically with respect to bidirectional disclosure between a plurality of users communicating with each other on the basis of disclosure settings of the space information regarding each of the plurality of users; and outputting output information to the user by an output device, the output information including the space information regarding a user of a communication counterpart processed on the basis of the adjustment parameters and information indicating determination reasons of the adjustment parameters.

Furthermore, according to the present disclosure, there is provided a recording medium in which a program is recorded, the program for causing a computer to function as: a determination unit that determines adjustment parameters of space information asymmetrically with respect to bidirectional disclosure between a plurality of users communicating with each other on the basis of disclosure settings of the space information regarding each of the plurality of users; and an output control unit that outputs output information to the user, the output information including the space information regarding a user of a communication counterpart processed on the basis of the adjustment parameters and information indicating determination reasons of the adjustment parameters.

Effects of the Invention

As described above, according to the present disclosure, a mechanism capable of realizing more comfortable communication by connecting spaces to each other while permitting asymmetry is provided. Note that the effect described above is not necessarily restrictive, and any effect set forth in the present specification or other effects that can be grasped from the present specification may be accomplished together with or instead of the effect described above.

MODE FOR CARRYING OUT THE INVENTION

Figure 1:
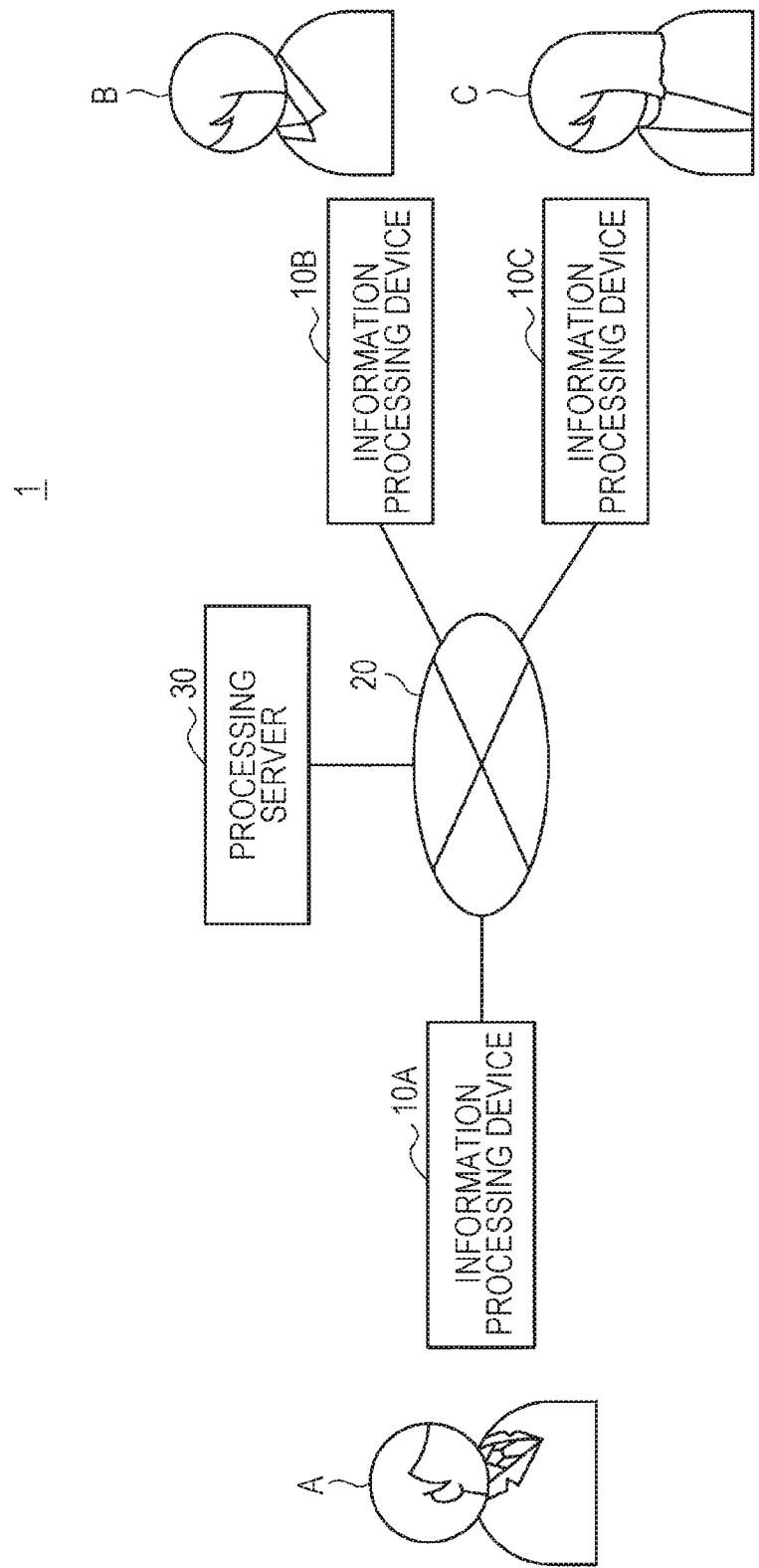
FIG. 1 is a view illustrating an entire configuration of a communication system according to the present embodiment.

Hereinafter, preferred embodiments of the present disclosure will be described in detail with reference to the accompanying drawings. Note that, in the present specification and the drawings, components having substantially the same functional configuration will be denoted by the same reference numerals and an overlapping description will be omitted.

Furthermore, in the present specification and the drawings, components having substantially the same functional configuration may be distinguished from one another by attaching different alphabets after the same reference numerals. For example, a plurality of components having substantially the same functional configuration are distinguished from one another like information processing apparatus 10A, 10B, and 10C, if necessary. However, in a case where the plurality of components having substantially the same functional configuration need not be particularly distinguished from one another, only the same reference numeral is attached to the plurality of components having substantially the same functional configuration. For example, in a case where it is not necessary to distinguish the information processing apparatuses 10A, 10B and 10C from one another, the information processing apparatuses 10A, 10B and 10C are simply referred to as an information processing apparatus 10.

Note that a description will be given in the following order.

1. Introduction
1.1. Overview
1.2. Related Art
2. Configuration of Information Processing Apparatus
3. Operation Processing
4. Specific Example of Output Information
5. Switching Processing
6. Hardware Configuration Example
7. Summary <<1. Introduction>>
<1.1. Overview>

An overview of a communication system 1 according to an embodiment of the present disclosure will be described with reference to FIGS. 1 and 2.

FIG. 1 is a view illustrating an entire configuration of a communication system 1 according to the present embodiment. As illustrated in FIG. 1, in the communication system 1 according to the present embodiment, information processing apparatuses 10A, 10B, and 10C are connected to each other through a network 20. The information processing apparatuses 10A, 10B, and 10C are arranged at a point A, a point B, and a point C, respectively, and spaces of the respective points may be connected to each other by video, audio, and other information channels to make users feel as if the respective spaces are connected to each other. For example, when a parent and a child live apart from each other, it is possible to make their living spaces seem to be connected to each other through a display device corresponding to a window or a door. In a case where the living spaces are connected to each other, the user can live while roughly grasping a state of a counterpart space (for example, a state of the child, a state of the parent, or the like).

The communication system 1 constantly connects the spaces to each other by permanently transmitting and receiving space information (for example, a video, an audio and the like) in each space. It is possible to connect spaces/users positioned at remote locations to each other with a high realistic feeling by a constant connection service. However, discomfort can occur due to a difference in a situation or a deviation in a mental state (a difference in a noise level, a difference in tension, a difference in a mood of a place, a difference in privacy, or a difference in a connection request (the user wants to see information and wants to show a user of a communication counterpart information)) between spaces/users. Therefore, the communication system 1 transmits and receives a connection request of both of the connected users, such as that the user wants to show the user of the communication counterpart information/does not want to show the user of the communication counterpart information/wants to see information/does not want to see information to reflect the connection request on information. In particular, in the present embodiment, it is possible to permit the transmitted and received information to be asymmetric, and it is thus possible to provide a pleasant connection feeling for both of the users. Here, the connection feeling is a feeling that the spaces are connected to each other, and can also be referred to as a security feeling or a mutual presence feeling. Note that the communication system 1 can also connect between two points and may perform multipoint connection among three or more points.

The information processing apparatuses 10A to 10C perform synchronous processing of bidirectional communication, transmission and reception processing and output processing of space information, and the like. At least some of these types of processing may be performed by a processing server 30. Furthermore, the communication system 1 includes the processing server 30 in an example illustrated in FIG. 1, but the present disclosure is not limited thereto, and the communication system 1 may not include the processing server 30.

Figure 2:
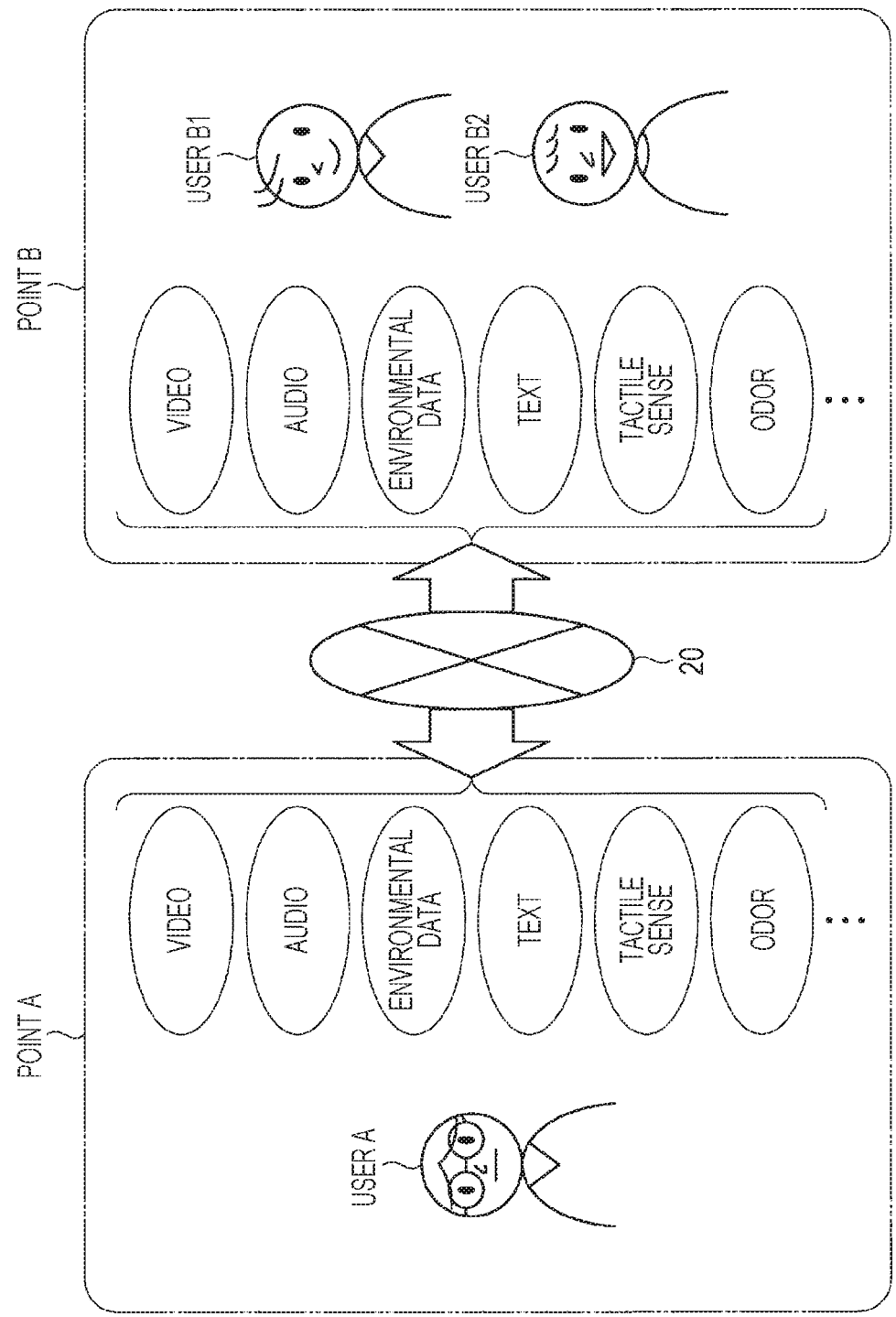
FIG. 2 is a view illustrating an example of an information channel transmitted and received in the communication system according to the present embodiment.

FIG. 2 is a view illustrating an example of an information channel transmitted and received in the communication system 1 according to the present embodiment. As illustrated in FIG. 2, user A present at point A and users B1 and B2 present at point B are connected to each other through a plurality of information channels such as a video, an audio, environmental data, a text, a tactile sense, an odor, and the like. Therefore, user A and users B1 and B2 can grasp videos, audios, environmental data, texts, tactile senses, odors, and the like, of their points to obtain a connection feeling.

<1.2. Related Art>

(1) Call Manner

The present manner is a manner in which a calling party calls a called party. The present manner is adopted in a telephone, an Internet telephone, a video conference system, or the like. A case of making a call after receiving the prior approval of the called party is also included in the present manner.

In the present manner, a call can be made depending on a circumference of the calling party. Therefore, discomfort or difficulty in use in the called party has been caused, for example, the called party has been forcibly urged to start a talk even though the called party is not necessarily in a situation in which he/she can start the talk or desires the talk. On the contrary, the calling party may also hesitate to make a call in consideration of a counterpart.

As a measure to prevent or reduce such inconvenience, muting or silencing of an incoming call has been performed by notification using vibration or lighting of a light emitting diode (LED). However, in these measures, an effect of allowing the incoming call to be necessarily received, in other words, making the user aware of the incoming call has been reduced. Besides, a measure such as a measure for the called party to turn off the power, a measure to set an automatic answering mode, or the like can be considered, but this measure is also not sufficient in that it cannot respond to a talk request.

Furthermore, as another measure, there is a method of originating a call at a timing when both of users can talk to each other by disclosing and sharing a state such as a status where the users are in a meeting, a state where the user is away from his/her seat, or the like, in advance. However, according to this method, it has taken time and effort to constantly input a user himself/herself status, and a frequency of updating the status has been reduced due to the time and effort. Furthermore, even in a case where the status is automatically updated on the basis of schedule information, device information of a terminal used by the user, or the like, a doubt such as whether or not the status is correct or whether or not the talk is really possible could arise, such that credibility and accuracy was insufficient.

(2) Monitoring Camera Manner

The present manner is a method in which a monitoring person unilaterally monitors a target person to be monitored (in other words, a person to be monitored). The present manner is adopted when connecting between users/spaces having asymmetry in a relationship such as, for example, elderly people, infants or pets and their protectors, employees and employers that are targets to be cared for.

In the present manner, although there is an exception, information is transmitted unilaterally from the target person to be monitored to the monitoring person. In this case, the target person to be monitored feels a very large privacy violation and is subjected to a mental load. Furthermore, a sense of moral obligation is imposed on the monitoring person. Therefore, the present manner is not adopted in a relation having an equal relationship or a relation that wants to have a corresponding relationship.

(3) Constant Text Connection Manner

The present manner is a manner of constantly transmitting and receiving text messages between users.

In a messaging application such as a short message service (SMS) or the like, by sending text input information or an image to each other, it is possible to provide a feeling that users are constantly connected to each other (in other words, a connection feeling), which was difficult to provide by the call manner or the monitoring camera manner. However, in the present manner, only information actively input by the user has been transmitted or received. Therefore, the input information may be different from a situation where the user is actually placed or a state of the user. Furthermore, since information that the user is not conscious of, such as an unconscious action of the user, or the like, is not input, the information is not originally exchanged, and a connection feeling that can be provided has remained superficial.

(4) Connection Feeling Adjustment Manner

The present manner is a manner disclosed in the above Patent Document 1, and is a manner of adjusting an information disclosure level (in other words, a privacy disclosure level) depending on a connection request degree of each point. However, in the present manner, the information disclosure levels of each point have been only uniformly adjusted.

<<2. Configuration of Information Processing Apparatus>>

Figure 3:
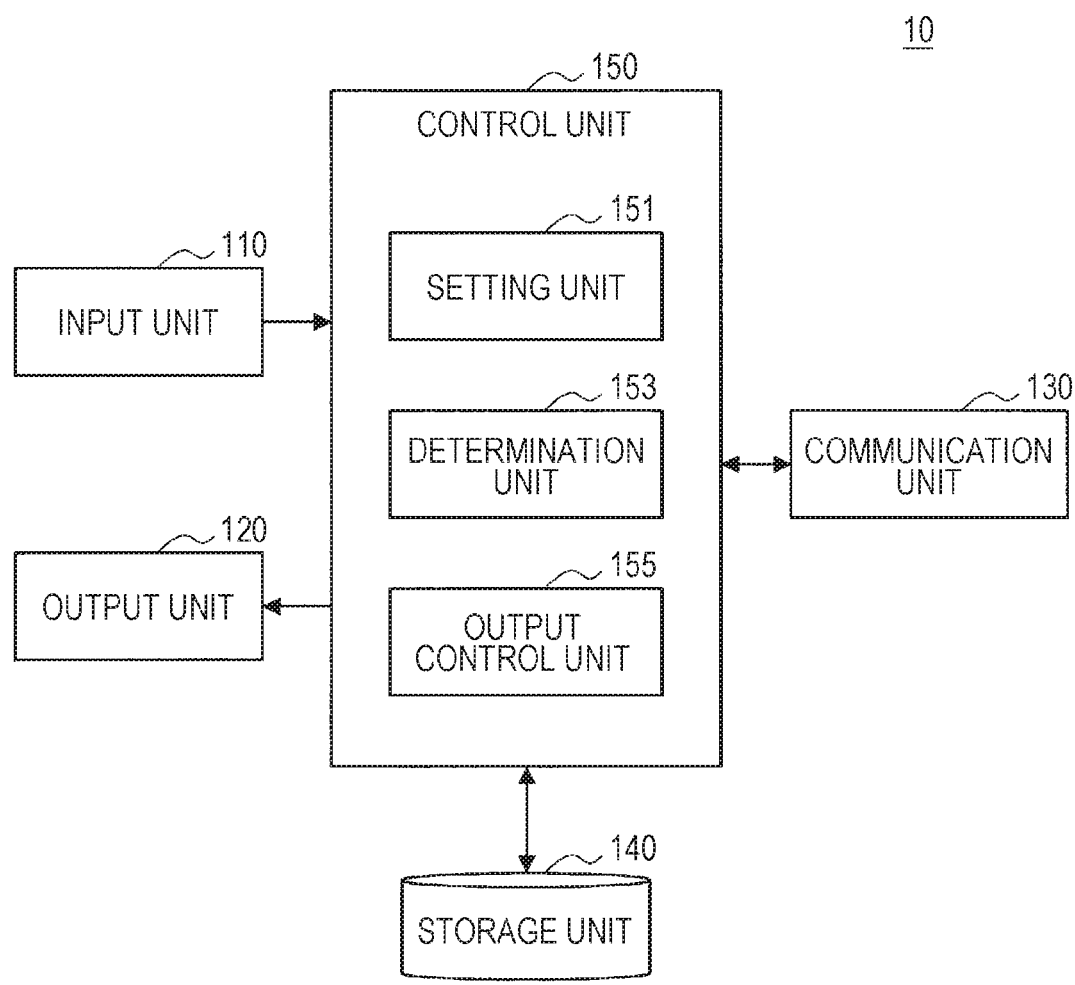
FIG. 3 is a block diagram illustrating an example of a configuration of an information processing apparatus according to the present embodiment.

FIG. 3 is a block diagram illustrating an example of a configuration of an information processing apparatus 10 according to the present embodiment. As illustrated in FIG. 3, the information processing apparatus 10 includes an input unit 110, an output unit 120, a communication unit 130, a storage unit 140, and a control unit 150.

Hereinafter, an index "first" may be attached to a point, a space, and a user where the information processing apparatus 10 is in charge of input and output, and information corresponding to the point, the space, and the user. Furthermore, an index "second" may be attached to a point, a space, and a user where one or a plurality of information processing apparatuses 10 of a communication counterpart of the information processing apparatus 10 is in charge of input and output, and information corresponding to the point, the space, and the user. For example, the information processing apparatus 10 transmits first space information acquired in a first space in which a first user is present to the information processing apparatus 10 of the communication counterpart (in other words, to a second user/second space/second point). Furthermore, the information processing apparatus 10 receives second space information acquired in the second space in which the second user is present from the information processing apparatus 10 of the communication counterpart, and outputs the second space information to the first user. Furthermore, regarding the information processing apparatus 10A, user A is the first user, and another user is the second user. Note that the number of second users may be plural, and in detail, the plurality of second users may be present at one second point, and the plurality of second users may be dispersed at a plurality of second points, respectively.

(1) Input Unit 110

The input unit 110 has a function of inputting space information. Specifically, the input unit 110 inputs first space information regarding the first user. The first space information input by the input unit 110 includes information such as, for example, a video, an audio, environmental data, a text, a tactile sense, an odor, and the like, of a space (a living room or the like, which may not exist) of the first user/in which the first user is present, or associated with the first user. Specifically, the space information can include information indicating a state of the space, such as brightness of the space, a temperature, humidity, an environmental sound, a width of the space, a state of the information processing apparatus 10, and the like. Furthermore, the space information includes information indicating a state of the first user, such as a position of the first user, a distance between the first user and a display region of output information, a motion of the first user, a gaze point of the first user, and the number and configurations of first users present in the same space, a posture of the first user, and the like.

For example, the input unit 110 is realized by a camera, a mic (abbreviation of a microphone), and a sensor. The number of cameras may be plural, and the camera captures an image in a space (for example, a living room) to acquire a captured image. Furthermore, the number of microphones may be plural, and the microphone collects an audio in the space and an environmental sound in the periphery (for example, the next room, a corridor, the outside of a house, or the like) of the space to acquire audio data. Furthermore, the sensor has a function of detecting various types of information in the space and the periphery of the space, and is assumed to be, for example, a temperature sensor, a humidity sensor, an illuminance sensor, an odor sensor, a human sensor, a door open/close sensor, and the like.

(2) Output Unit 120

The output unit 120 outputs output information using each device on the basis of control by an output control unit 155. For example, the output unit 120 includes a display device such as a display, a projector or the like, an audio output device such as a speaker or the like, and a notification device such as an LED lamp, an indicator and the like, and performs display output, audio output, and notification output. The display device displays space image information generated by the output control unit 155. Furthermore, the audio output device outputs space audio information generated by the output control unit 155.

(3) Communication Unit 130

The communication unit 130 performs transmission and reception of information between the information processing apparatus 10 and another apparatus. For example, the communication unit 130 transmits and receives space information to and from an information processing apparatus 10 of the second user, that is, the communication counterpart.

(4) Storage Unit 140

The storage unit 140 temporarily or permanently stores information for an operation of the information processing apparatus 10. For example, the storage unit 140 stores space information and a connection request setting.

(5) Control Unit 150

The control unit 150 functions as an arithmetic processing unit and a control unit, and generally controls an operation in the information processing apparatus 10 according to various programs. The control unit 150 includes a setting unit 151, a determination unit 153, and an output control unit 155. Note that the control unit 150 may also include other components. In other words, the control unit 150 can also perform operations other than operations by these components. Hereinafter, these components will be described in detail.

(6) Setting Unit 151

The setting unit 151 has a function of setting the connection request setting. The connection request setting is setting information regarding connection between the spaces. The connection request setting includes a connection request level, a privacy setting, a communication amount suppression setting, an individual setting, and the like. The connection request level is setting information that defines a connection degree between the spaces by a level (that is, a number). The privacy setting is a setting for information that a user wants to show a user of a communication counterpart/does not want to show the user of the communication counterpart/wants to see/does not want to see. The communication amount suppression setting is a setting for suppressing a communication amount. The individual setting is a setting for reflecting a user's hobby and taste in the output information.

In particular, the setting unit 151 sets a first connection request setting regarding the first user. For example, the first connection request setting includes a first disclosure setting related to the disclosure (in other words, transmission/transport) of the first space information regarding the first user to the second user. It becomes possible for the first user to filter and transmit (for example, selectively), for example, at least a portion of the first space information to the second user, by the first disclosure setting. Furthermore, the first connection request setting includes a first output setting related to output of the second space information regarding the second user to the first user. It becomes possible for the first user to filter and (for example, selectively) output at least a portion of the second space information received from the second user to the first user, by the first output setting.

The setting unit 151 may set the connection request setting on the basis of an intentional instruction such as an audio input from the first user, or the like. Besides, the setting unit 151 may automatically set the connection request setting on the basis of a state of the first space or the first user. For example, the setting unit 151 may reset the connection request level to a low level in a case where the first space is in a predetermined state such as a state in which it is messy or electricity is turned off in the first space. Furthermore, the setting unit 151 may reset the connection request level to be high in a case where the first user becomes close to the displayed output information, and may reset the connection request level to be low in a case where the first user becomes distant from the display output information. Furthermore, the setting unit 151 may reset the connection request level to be low in a case where the first user performs a predetermined action such as changing his/her clothes. It is possible to protect the privacy of the user and ensure continuity of the connection by such an automatic setting.

The setting unit 151 shares the connection request setting with the information processing apparatus 10 of the communication counterpart. For example, the setting unit 151 transmits the first connection request setting to the information processing apparatus 10 of the communication counterpart, and receives a second connection request setting from the information processing apparatus 10 of the communication counterpart. Note that the second connection request setting includes a second disclosure setting related to disclosure of the second space information regarding the second user to the first user and a second output setting related to output of the first space information regarding the first user to the second user.

(7) Determination Unit 153

The determination unit 153 has a function of determining adjustment parameters related to processing of space information regarding each user on the basis of connection request settings of a plurality of users communicating with each other. In other words, the determination unit 153 has a function of determining adjustment parameters related to processing of the first space information and processing of the second space information on the basis of the first connection request setting and the second connection request setting. The processing here refers to processing of the first space information and processing of the second space information in the information processing apparatus 10, and processing of the first space information and processing of the second space information in the information processing apparatus 10 of the communication counterpart.

In detail, the determination unit 153 determines adjustment parameters related to disclosure on the basis of disclosure settings of space information regarding the plurality of users communicating with each other. In other words, the determination unit 153 determines the adjustment parameters regarding the disclosure on the basis of the first disclosure setting related to the disclosure of the first space information regarding the first user to the second user and the second disclosure setting related to the disclosure of the second space information regarding the second user to the first user. More simply, the determination unit 153 determines the adjustment parameters related to the disclosure so that space information that the first user wants to show the second user is disclosed and space information that the second user wants to show the first user is disclosed. The adjustment parameters related to the disclosure include information indicating an information channel and an information amount permitted to be disclosed among the input space information, image processing to be applied before transmission, transmission processing to be applied at the time of transmission, and the like.

Furthermore, the determination unit 153 determines adjustment parameters related to output on the basis of output settings of the space information regarding the plurality of users communicating with each other. In other words, the determination unit 153 determines the adjustment parameters regarding the output on the basis of the first output setting related to the output of the second space information regarding the second user to the first user and the second output setting related to the output of the first space information regarding the first user to the second user. More simply, the determination unit 153 determines the adjustment parameters related to the output so that space information that the first user wants to see among the received space information of the second user is output and space information that the second user wants to see among the received space information of the first user is output. The adjustment parameters related to the output include information indicating an information channel and an information amount permitted to be output among the space information received from the communication counterpart, image processing to be applied before output, reception processing to be applied at the time of reception, and the like.

Here, the determination unit 153 can asymmetrically determine the adjustment parameters. More specifically, the determination unit 153 can determine the adjustment parameters of the space information asymmetrically with respect to bidirectional disclosure between the plurality of users on the basis of the disclosure settings of the space information regarding each of the plurality of users communicating with each other. Furthermore, the determination unit 153 can determine the adjustment parameters of the space information asymmetrically with respect to bidirectional output between the plurality of users on the basis of the output settings of the space information regarding each of the plurality of users communicating with each other. That is, the determination unit 153 can asymmetrically, in other words, differently determine adjustment parameters for processing in the information processing apparatus 10 and adjustment parameters for processing in the information processing apparatus 10 of the communication counterpart. For example, the determination unit 153 makes a determination so that only some of the first space information is disclosed to the communication counterpart even in a case where all of the second space information is disclosed from the communication counterpart. By permitting asymmetry, it is possible to appropriately protect privacy in accordance with individual user's circumstances or thoughts, and it is thus possible to give the user a pleasant connection feeling. However, as in the monitoring camera manner described above, in a case where the asymmetry is excessive, it will be difficult to provide the pleasant connection feeling to both of the users, and it is thus desirable that the asymmetry is within a predetermined range.

Here, an adjustment parameter whose reduction amount in an amount of information at the time of processing is small, in other words, an adjustment parameter whose processing amount is small, is also referred to as an adjustment parameter having a high connectivity. Furthermore, an adjustment parameter whose reduction amount in an amount of information at the time of processing is large, in other words, an adjustment parameter whose processing amount is large, is also referred to as an adjustment parameter having a low connectivity.

Note that the determination by the determination unit 153 may be performed in cooperation with the information processing apparatus 10 of the communication counterpart. Furthermore, the determination unit 153 may determine only an adjustment parameter to be applied in the information processing apparatus 10 among the adjustment parameters, and an adjustment parameter applied to the information processing apparatus 10 of the communication counterpart may be determined by the information processing apparatus 10 of the communication counterpart.

Specific determination processing of the adjustment parameter will be described in detail below.

Application of Connection Request Level

For example, a connection request level and an adjustment parameter that is to be determined may be associated with each other on a one-to-one basis, and the determination unit 153 may determine the adjustment parameter with reference to this correspondence table.

Application of Adjustment Map

In a case where there is a difference between a first connection request level and a second connection request level, the determination unit 153 may correct the connection request levels so as to fill the difference. The correction of the connection request levels is also processing included in the determination of the adjustment parameter. Of course, the correction using an adjustment map may not be performed. For example, the determination unit 153 may correct each of the first connection request level and the second connection request level to an average value or a median value, or may correct each of the first connection request level and the second connection request level to the highest connection request level or the lowest connection request level. The adjustment map can be applied to the correction. An example of the application will be described with reference to FIG. 4.

Figure 4:
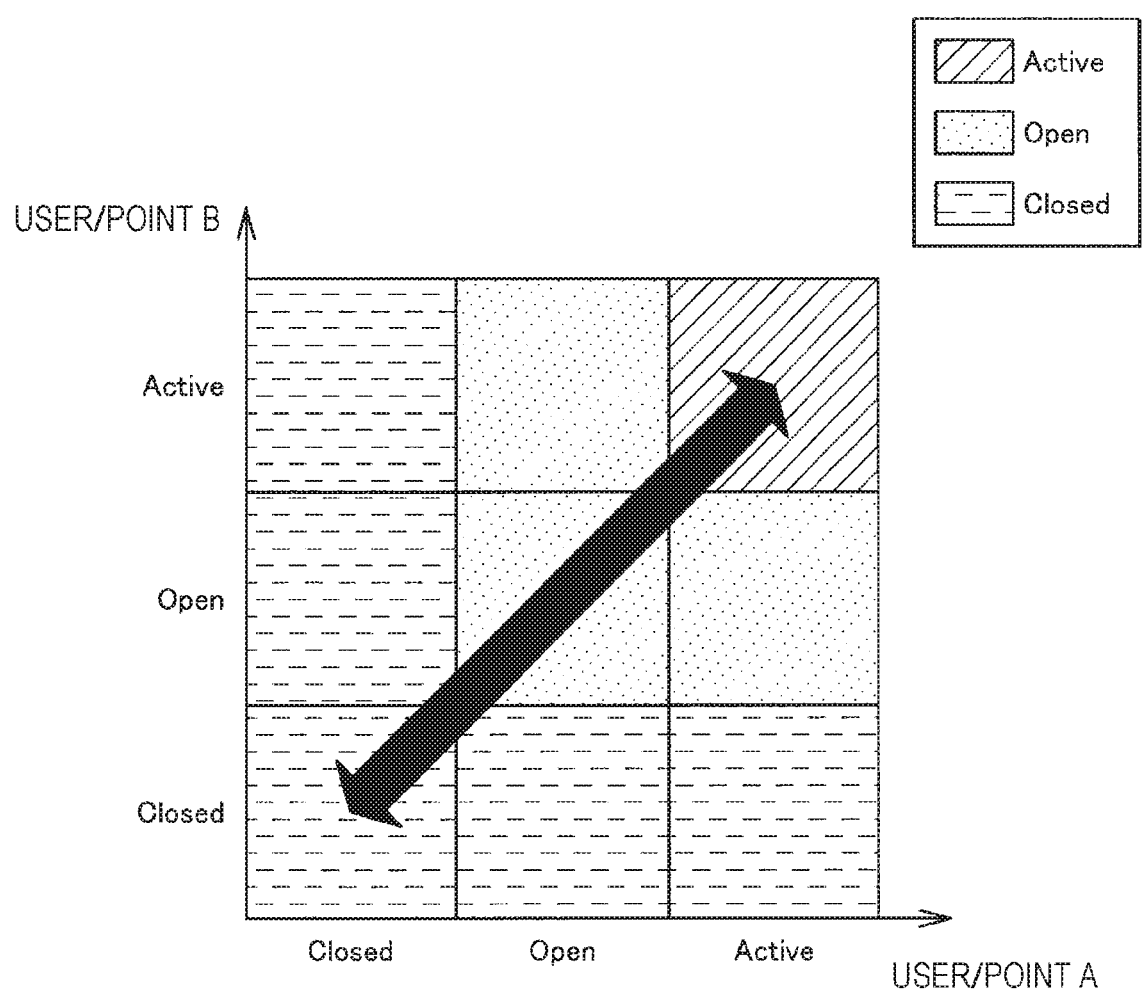
FIG. 4 is a view for describing an example of adjustment parameter determination processing according to the present embodiment.

FIG. 4 is a view for describing an example of adjustment parameter determination processing according to the present embodiment. In FIG. 4, an adjustment map for correcting connection request levels for communication between user A and user B is illustrated. A horizontal axis represents a connection request level of user A for communication with user B in three levels (closed, open, and active). Furthermore, a vertical axis represents a connection request level of user B for communication with user A in three levels (closed, open, and active). According to the adjustment map illustrated in FIG. 4, if both of the connection request levels of user A and user B are active, the connection request levels are corrected to be active (in other words, is not corrected). Furthermore, if at least one of the connection request levels of user A and user B is closed, the connection request level is corrected to be closed (in other words, one connection request level that is not closed is corrected to be closed). Furthermore, otherwise, the connection request level is corrected to open.

Note that the adjustment map illustrated in FIG. 4 can be said to be a map for correcting the connection request level to the lowest connection request level. The determination unit 153 may apply an adjustment map other than the adjustment map illustrated in FIG. 4, such as a map that corrects the connection request level to the highest connection request level, or the like.

Application of Privacy Setting

The determination unit 153 may determine the adjustment parameter on the basis of the privacy setting. An example of the privacy setting is illustrated in the following Table 1.

TABLE 1

Example of Privacy Setting of User A

| Counter-part User | Mode | From User Himself/ Herself to Counterpart | From Counter-part to User Himself/ Herself | Asymmetry Permission |
|---|---|---|---|---|
| B | Opening Priority | Video OK Audio OK | Video OK Audio OK | Not Permitted |
| C | Privacy Protection Priority | Video OK Audio Mute | Video Blurred Audio Mute | Permitted |
| D | Balance Priority | Video Blurred Audio Mute | Video OK Audio Reduced | Partially Permitted |

Table 1 illustrates an example of privacy settings of user A for other users. A privacy setting may be set for each communication counterpart.

"Mode" is a name of a setting mode. Specific settings are defined in other items. The "mode" may be information specifying an adjustment map that is to be applied. For example, in a case of an opening priority mode, the determination unit 153 applies an adjustment map that corrects the connection request level to the highest connection request level among a plurality of connection request levels. Furthermore, in a case of a privacy protection priority mode, the determination unit 153 applies an adjustment map that corrects the connection request level to the lowest connection request level among the plurality of connection request levels. Furthermore, in a case of a balance priority mode, the determination unit 153 applies an adjustment map that corrects the connection request level to a connection request level of an average value or a median value among the plurality of connection request levels.

"From User Himself/Herself to Counterpart" is a setting related to the disclosure of the first space information from the first user to the second user. Furthermore, "From Counterpart to User Himself/Herself" is a setting related to the disclosure of the second space information from the second user to the first user. Video OK/Video Blurred indicates that a video is disclosed as it is or is disclosed in a blurred state (or an intensely blurred state). Audio OK/Mute/Reduced indicates that an audio is disclosed as it is/in a mute state/a reduced state.

"Asymmetric Permission" is a setting as to whether or not to permit asymmetry of the adjustment parameter. As illustrated in Table 1, in a case where asymmetry is permitted, information disclosed "From User Himself/Herself to Counterpart" does not coincide with information disclosed "From Counterpart to User Himself/Herself".

As such, by reflecting settings of a privacy consideration mode, for example, it is possible to perform adjustment such as equally disclosing space information, blurring and disclosing space information in the connection with a space in which privacy management restriction is strong, or the like.

Application of Communication Amount Suppression Setting

The information processing apparatus 10 may determine the adjustment parameter on the basis of the communication amount suppression setting. An example of the communication amount suppression setting is illustrated in the following Table 2.

TABLE 2

Example of Communication Amount Suppression Setting of User A

| Counter-part User | Mode | Data Amount | Delay mount |
|---|---|---|---|
| B | Suppression Amount: Large | Compression: Large Intermittence: Large | Delay: Medium |
| C | Suppression Amount: Small | Compression: Small Intermittence: Small | Delay: Small |
| D | Suppression Amount: Medium | Compression: Large Intermittence: Small | Delay: Medium |

Table 2 illustrates an example of communication amount suppression settings of user A for other users. The communication amount suppression setting may be set for each communication counterpart.

"Mode" is a name of a setting mode. Specific settings are defined in other items. For example, if a suppression amount is large, a communication amount is greatly suppressed. Specifically, transmission/reception processing in which a compression rate and an intermittence rate are large and a medium delay is permitted is performed. For example, if a suppression amount is small, a communication amount is small suppressed. Specifically, transmission/reception processing in which a compression rate and an intermittence rate are small and a small delay is permitted is performed. For example, if a suppression amount is medium, a communication amount is moderately suppressed. Specifically, transmission/reception processing in which a compression rate is large and an intermittence rate is small and a medium delay is permitted is performed. Note that the intermittence rate is a rate at which a frame rate of a video, a sampling rate of an audio, or the like, is dropped.

For example, assume that a data amount (in other words, traffic) or data cost in a network fluctuates. In that case, the determination unit 153 determines an adjustment parameter that decreases a communication amount while decreasing a quality of space information by increasing a compression rate and permits a transmission delay to also increase, regarding communication between user A and user B assumed to be greatly affected by the fluctuation. On the other hand, the determination unit 153 determines an adjustment parameter that decreases a suppression amount of a communication amount, regarding the communication between user A and user C in which a dedicated communication band or the like is assumed.

Furthermore, in a case where a predetermined connection feeling cannot be provided due to a communication band or a quality, the user is notified that the predetermined connection feeling cannot be provided. For example, in a case where it is difficult to perform connection in a state where a connectivity is increased due to a limitation of a communication amount, a dome-shaped enclosure display 303 illustrated in FIG. 11 may be notified.

Note that since a constant connection service can be used constantly, in a wide band, and at multiple points as compared with a spot connection service such as video chatting or the like, communication traffic and a network load can increase. This results in a deterioration of a line quality or a communication limitation, which in turn deteriorates a quality of the constant connection service. Therefore, when applying the communication amount suppression setting, there is an effect of maintaining the quality of the constant connection service itself as well as a direct effect of suppressing the communication amount.

Application of Individual Setting

The information processing apparatus 10 may determine the adjustment parameter on the basis of the individual setting. The individual setting is a setting based on a hobby and a taste of the first user. The individual setting may be set for each communication counterpart.

Figure 11:
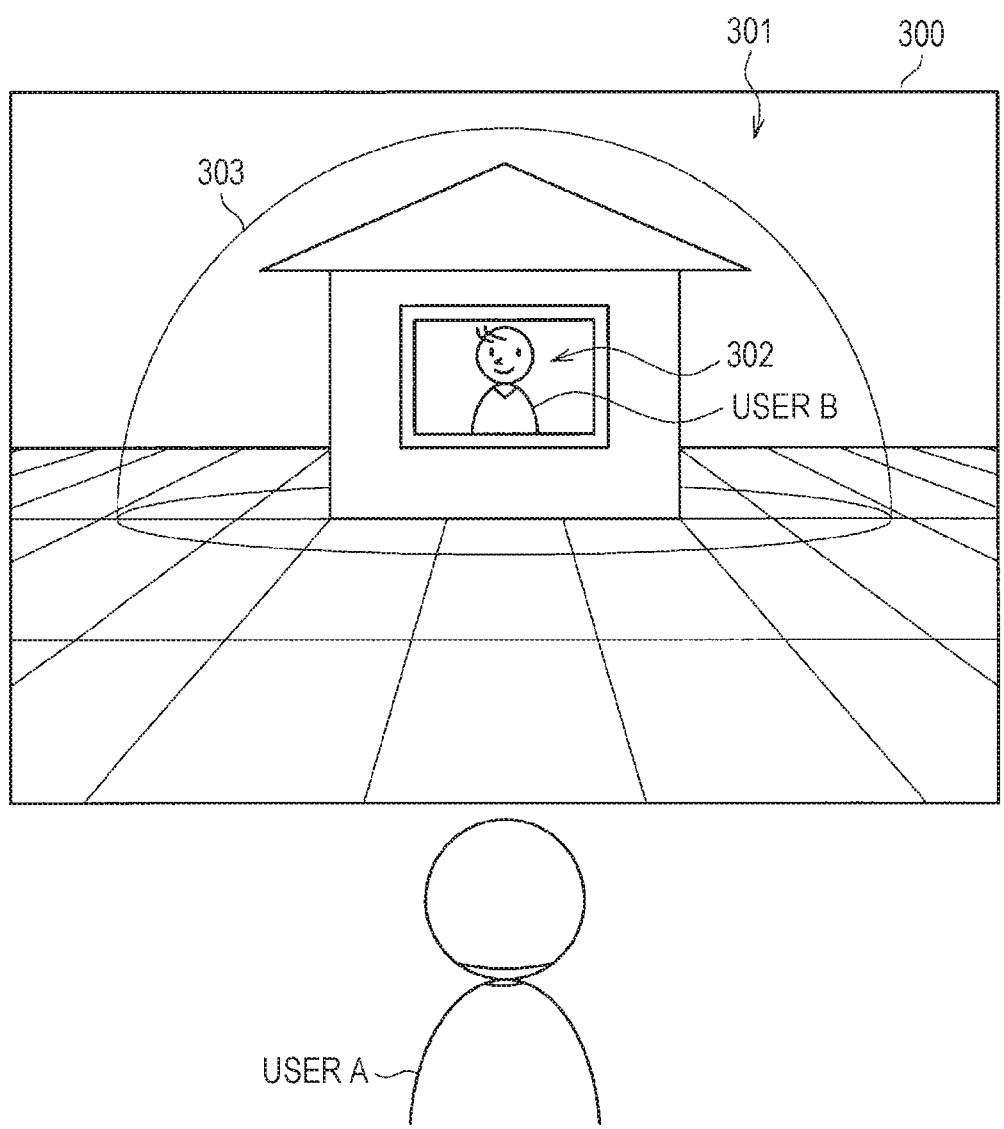
FIG. 11 is a view for describing a first display example of space video information according to the present embodiment.

By applying the individual setting, it is possible to set various scenes such as a scene of a streetscape, a scene in a forest, a scene of a town, a scene of a space, a scene of a sea floor, and the like, of a game, for example, as a background of a virtual three-dimensional space illustrated in FIG. 11. Furthermore, by applying the individual setting, it is possible to hide a specific second user, as described with reference to, for example, FIG. 13.

(8) Output Control Unit 155

The output control unit 155 has a function of controlling the disclosure of the information to the second user by the communication unit 130 and controlling the output of the information to the first user by the output unit 120.

Disclosure Control

The output control unit 155 processes the first space information on the basis of the determined adjustment parameter, and controls the communication unit 130 to transmit the processed first space information to the second user, in other words, the information processing apparatus 10 of the communication counterpart. In detail, the output control unit 155 extracts an information channel and an information amount permitted to be disclosed from the first space information, applies image processing that is to be applied, and applies transmission processing that is to be applied, according to the adjustment parameter related to the disclosure. In this case, the output control unit 155 may generate setting data for each module such as a video size, a frame rate, an audio format, and the like, on the basis of the adjustment parameter, and perform processing on the basis of the setting data.

Output Control

The output control unit 155 controls the output unit 120 to generate output information and output the generated output information to the first user.

The output control unit 155 generates the output information by processing the second space information received from the second user, in other words, from the information processing apparatus 10 of the communication counterpart on the basis of the determined adjustment parameter. In detail, the output control unit 155 applies reception processing that is to be applied to receive the second space information, extracts an information channel and an information amount permitted to be output from the second space information, and applies image processing that is to be applied, according to the adjustment parameter related to the output. In this case, the output control unit 155 may generate setting data for each module such as a video size, a frame rate, an audio format, and the like, on the basis of the adjustment parameter, and perform processing on the basis of the setting data.

The output information includes at least space video information which is a video and space audio information which is an audio. For example, the output control unit 155 generates the space video information on the basis of the video included in the processed second space information. The output control unit 155 generates the space audio information on the basis of the audio included in the processed second space information. For example, the space video information includes a state of the second user, and the space audio information also includes an audio of the second user. It is desirable that the audio of the second user included in the space audio information is localized according to a position of the second user included in the space video information.

Furthermore, in a case where the number of second users is plural, in other words, in a case where multipoint connection with a plurality of second spaces is made, the output control unit 155 may switch connection between two points by time division or may output information of multiple points in parallel.

Of course, the output control unit 155 may generate the output information on the basis of a text, environmental data or the like, in addition to the video or the audio.

<<3. Operation Processing>>

Hereinafter, operation processing according to the present embodiment will be described with reference to FIGS. 5 and 6.

Figure 5:
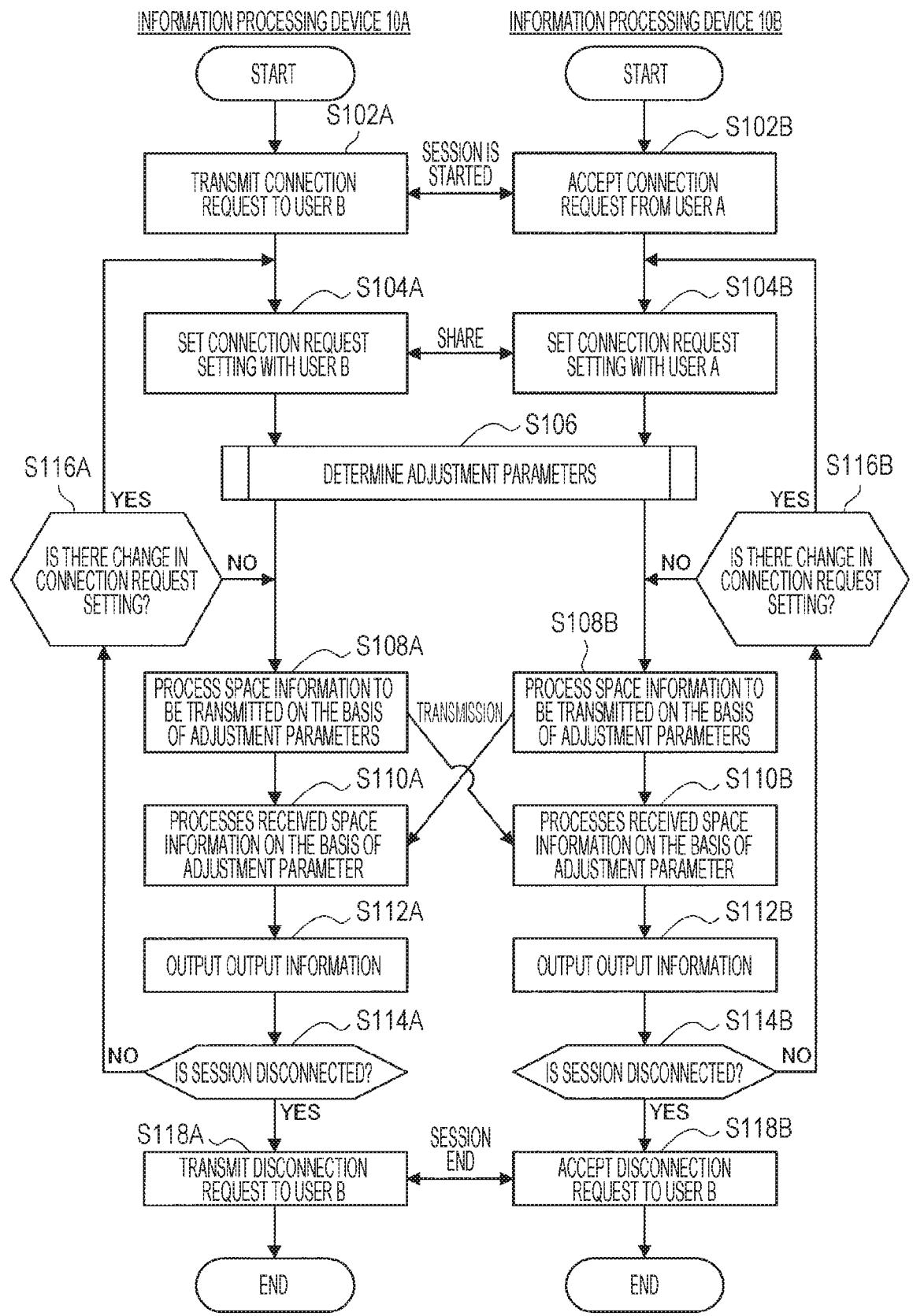
FIG. 5 is a sequence diagram illustrating an example of a flow of space connection processing executed in the communication system according to the present embodiment.

FIG. 5 is a sequence diagram illustrating an example of a flow of space connection processing executed in the communication system 1 according to the present embodiment. As illustrated in FIG. 5, the information processing apparatus 10A and the information processing apparatus 10B are involved in this sequence.

First, the information processing apparatus 10A transmits a connection request to user B (step S102A). When the information processing apparatus 10B accepts the connection request from user A, a session between the information processing apparatus 10A and the information processing apparatus 10B is started (step S102B).

Next, the information processing apparatus 10A sets a connection request setting with user B to share the connection request setting with the information processing apparatus 10B (step S104A). Furthermore, the information processing apparatus 10B sets a connection request setting with user A to share the connection setting with the information processing apparatus 10A (step S104B).

Then, the information processing apparatus 10A and the information processing apparatus 10B determine adjustment parameters on the basis of the connection request settings set by each of the information processing apparatus 10A and the information processing apparatus 10B (step S106).

Next, the information processing apparatus 10A and the information processing apparatus 10B process space information to be transmitted on the basis of the determined adjustment parameters, and transmit the processed space information to counterparts (steps S108A and S108B).

Next, the information processing apparatus 10A processes the space information received from the information processing apparatus 10B on the basis of the determined adjustment parameter to generate output information (step S110A). Furthermore, the information processing apparatus 10B processes the space information received from the information processing apparatus 10A on the basis of the determined adjustment parameter to generate output information (step S110B).

Then, the information processing apparatus 10A and the information processing apparatus 10B output the output information generated by each of the information processing apparatus 10A and the information processing apparatus 10B (steps S112A and S112B).

The information processing apparatus 10A and the information processing apparatus 10B repeat the processing described above until the session is disconnected (steps S114A/NO and S114B/NO). In detail, the information processing apparatus 10A and the information processing apparatus 10B repeat the processing according to steps S108A to S114A and S108B to S114B until there is a change in any of the connection request settings of the information processing apparatus 10A and the information processing apparatus 10B (step S116A/NO or S116B/NO). In a case where there has been a change in at least one of the connection request settings of the information processing apparatus 10A and the information processing apparatus 10B (step S116A/YES or S116B/YES), the information processing apparatus 10A and the information processing apparatus 10B perform the processing according to steps S104A, S104B, and S106.

In a case where the session is disconnected (step St 14A/YES or S114B/YES), for example, the information processing apparatus 10A transmits a disconnection request to user B (step S118A). When the information processing apparatus 10B accepts the disconnection request from user A, the session between the information processing apparatus 10A and the information processing apparatus 10B is disconnected (step S118B).

An example of the entire flow of the space connection process performed in the communication system 1 has been described hereinabove. Subsequently, adjustment parameter determination processing in step S106 will be described in detail with reference to FIG. 6.

Figure 6:
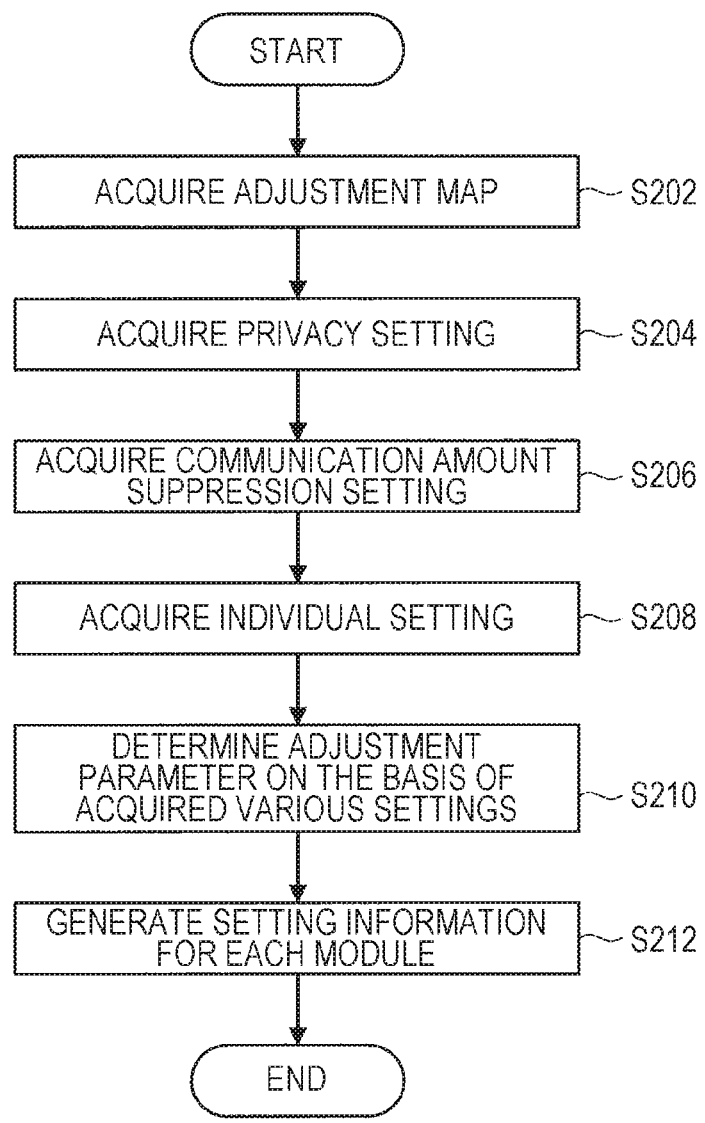
FIG. 6 is a flowchart illustrating an example of a flow of adjustment parameter determination processing executed in the information processing apparatus according to the present embodiment.

FIG. 6 is a flowchart illustrating an example of a flow of adjustment parameter determination processing executed in the information processing apparatus 10 (10A and 10B) according to the present embodiment. As illustrated in FIG. 6, first, the information processing apparatus 10 acquires an adjustment map, a privacy setting, a communication amount suppression setting, and an individual setting (steps S202, S204, S206, and S208). Then, the information processing apparatus 10 determines an adjustment parameter on the basis of various settings such as the acquired adjustment map, privacy setting, communication amount suppression setting, and individual setting (step S210). Next, the information processing apparatus 10 generates setting information for each module on the basis of the determined adjustment parameter (step S212).

<<4. Specific Example of Output Information>>

Hereinafter, specific examples of the output information will be described with reference to FIGS. 7 to 18.

(1) Outline of Output Information

Figure 7:
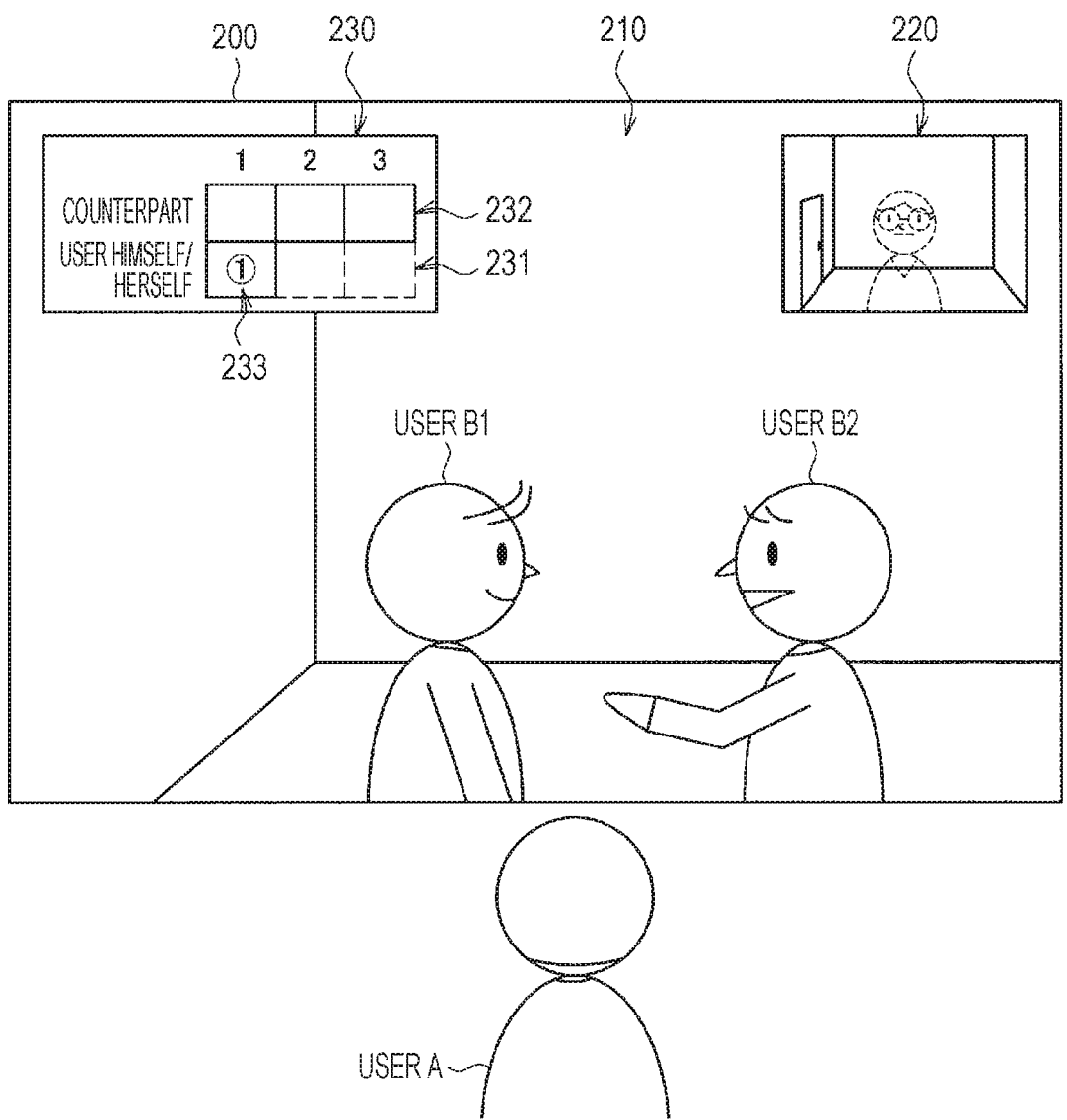
FIG. 7 is a view for describing an example of output information according to the present embodiment.

FIG. 7 is a view for describing an example of output information according to the present embodiment. In FIG. 7, output information 200 is displayed in a space in which user A is present. The output information 200 includes space video information 210 including users B1 and B2 of communication destinations. Note that an aspect ratio of the space video information is arbitrary.

Furthermore, the output information 200 includes a preview screen 220 displaying space information of user A processed on the basis of the adjustment parameter and transmitted to user B, more simply, space video information including user A displayed in a communication destination. By displaying the preview screen 220, user A can confirm how his/her information is disclosed to the communication counterpart. Therefore, for example, user A can feel relief by confirming that the connection request setting set by user A is reflected and the information is not excessively disclosed.

Furthermore, the output information 200 includes an adjustment parameter determination status 230. The adjustment parameter determination status 230 is information indicating a determination reason of the adjustment parameter. The adjustment parameter determination status 230 includes information indicating disclosure settings of a plurality of users communicating with each other. In detail, the adjustment parameter determination status 230 includes information 231 indicating a first connection request setting. The information 231 indicating the first connection request level is, for example, information indicating a connection request level of user A in three levels (1: closed, 2: open, and 3: active), and is level 1 in an example illustrated in FIG. 7. Furthermore, the adjustment parameter determination status 230 includes information 232 indicating a second connection request setting. The information 232 indicating the second connection request setting is, for example, information indicating connection request levels of users B1 and B2 in three levels (1: closed, 2: open, and 3: active), and is level 3 in an example illustrated in FIG. 7. Furthermore, the adjustment parameter determination status 230 includes information 233 indicating the determined adjustment parameter. In FIG. 7, a correction result of the connection request level is illustrated as the information 233 indicating the determined adjustment parameter, and it is illustrated that the connection request level is corrected to connection request level 1. By displaying such information indicating the determination reason of the adjustment parameter, user A can confirm that his/her connection request setting is reflected to have a feeling of satisfaction and a feeling of security for an adjustment result.

Besides, the adjustment parameter determination status may include various types of information. For example, the adjustment parameter determination status may include a list of information channels that are disclosed and are not disclosed. Furthermore, the adjustment parameter determination status may include information indicating an application situation regarding a privacy setting, a communication amount suppression setting, and an individual setting other than the connection request level.

(2) Variation of Adjustment Parameter Determination Status

The adjustment parameter determination status can be variously represented, in addition to that illustrated in FIG. 7. Examples of these representations will be described with reference to FIGS. 8 to 10.

First Display Example (Graph Representation)

Figure 8:
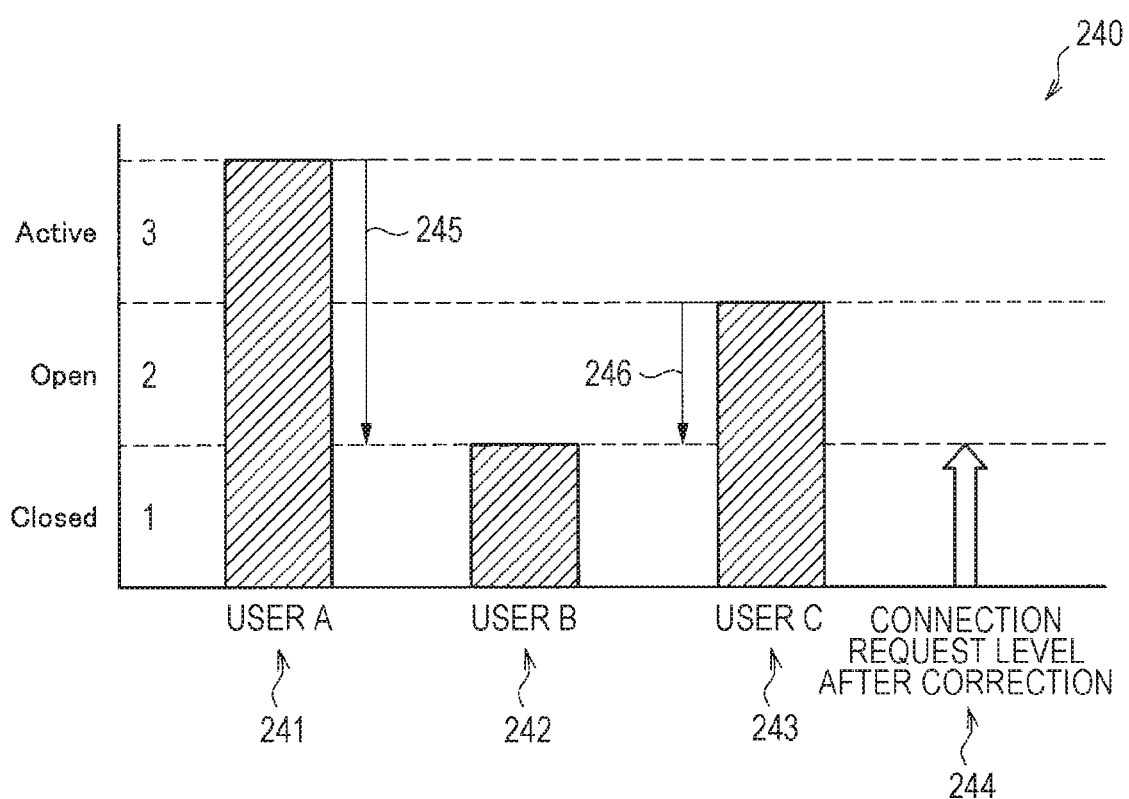
FIG. 8 is a view for describing a first display example of an adjustment parameter determination status according to the present embodiment.

FIG. 8 is a view for describing a first display example of an adjustment parameter determination status according to the present embodiment. In FIG. 8, an adjustment parameter determination status 240 is information in which information indicating disclosure settings of a plurality of users communicating with each other (in other words, information indicating a first connection request setting and information indicating a second connection request setting) and information indicating determined adjustment parameters are represented by a graph. According to the information 241 indicating the first connection request setting, a connection request level of user A is 3. According to the information 242 and 243 indicating the second connection request setting, connection request levels of users B and C are 1 and 2, respectively. According to information 244 indicating a connection request level after correction, it is indicated that each of the connection request levels of users A, B and C has been corrected to 1. Furthermore, information 245 and 246 indicating correction amounts regarding this correction is displayed.

Second Display Example (Two-Dimensional Plane Representation)

Figure 9:
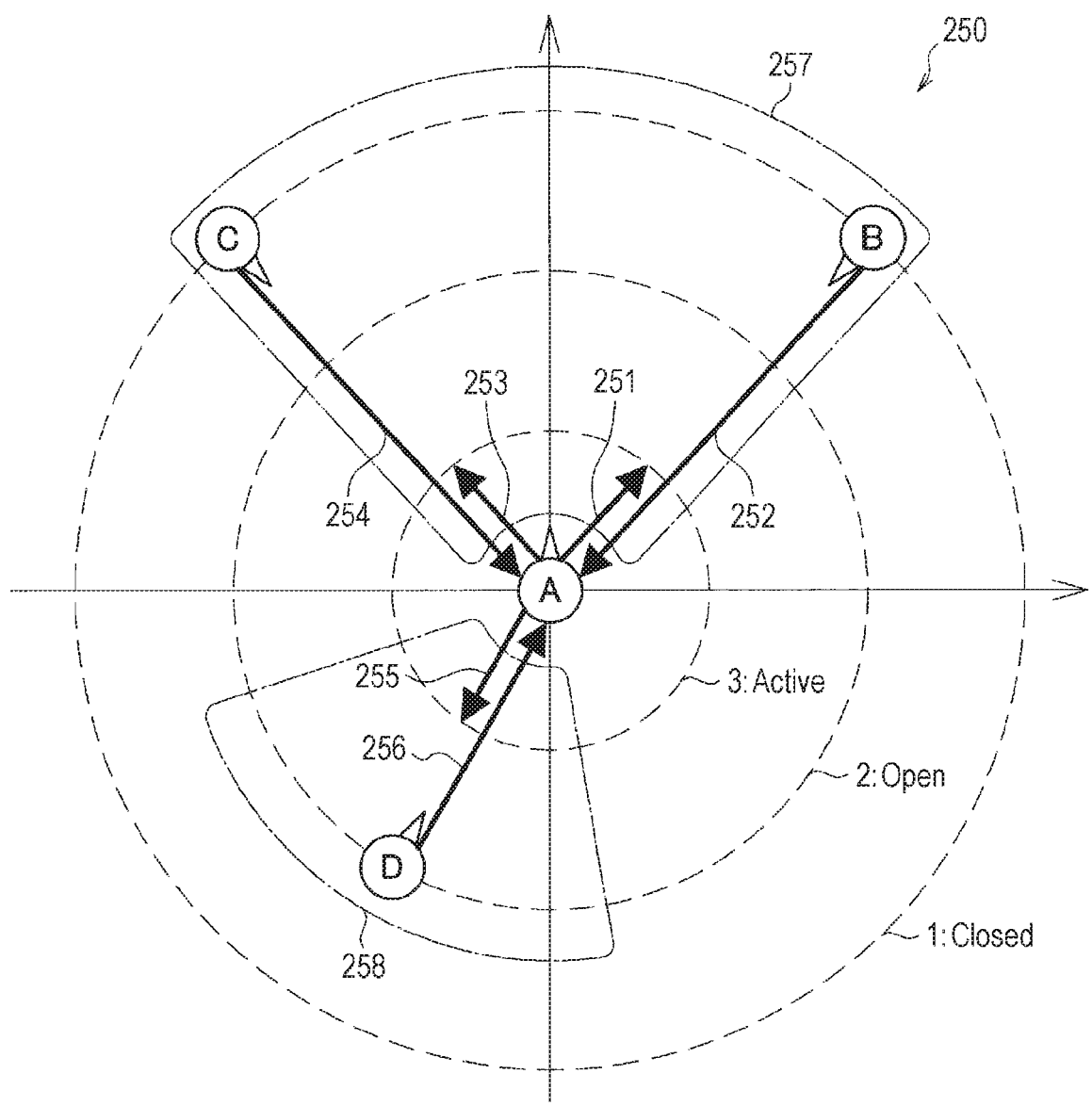
FIG. 9 is a view for describing a second display example of an adjustment parameter determination status according to the present embodiment.

FIG. 9 is a view for describing a second display example of an adjustment parameter determination status according to the present embodiment. In FIG. 9, an adjustment parameter determination status 250 is information in which information indicating disclosure settings of a plurality of users communicating with each other (in other words, information indicating a first connection request setting and information indicating a second connection request setting) and information indicating determined adjustment parameters are mapped to a two-dimensional plane. In FIG. 9, user A who is a first user is arranged at the origin, and users B, C, and D who are second users are arranged at positions corresponding to the determined adjustment parameters. As information indicating connection request settings, the connection request levels are represented as lengths of arrows starting from each user, and the longer the arrow, the lower the connection request level. Then, distances between users on the two-dimensional plane indicate connection request levels after correction.

For example, an arrow 251 from user A to user B indicates that a connection request level from user A to user B is 3, and an arrow 252 from user B to user A indicates that a connection request level from user B to user A is 1. Then, according to arrangement of user B, it is indicated that a connection request level has been corrected to 1 for communication between user A and user B.

Furthermore, an arrow 253 from user A to user C indicates that a connection request level from user A to user C is 3, and an arrow 254 from user C to user A indicates that a connection request level from user C to user A is 1. Then, according to arrangement of user C, it is indicated that a connection request level has been corrected to 1 for communication between user A and user C.

Furthermore, an arrow 255 from user A to user D indicates that a connection request level from user A to user D is 3, and an arrow 256 from user D to user A indicates that a connection request level from user D to user A is 2. Then, according to arrangement of user D, it is indicated that a connection request level has been corrected to 2 for communication between user A and user D.

Note that a relative positional relationship between the second users on the two-dimensional plane may correspond to an adjustment parameter (or a connection request setting) between the second users. For example, second users who are close to each other on the two-dimensional plane may be connected to each other using an adjustment parameter having a high connectivity. Furthermore, the second users may be grouped like groups 257 and 258 depending on a distance therebetween on the two-dimensional plane. For example, a plurality of second users included in one group fall within one visual field when viewed from user A, in a display example as described later with reference to FIG. 17.

Third Display Example (Filter Representation)

Figure 10:
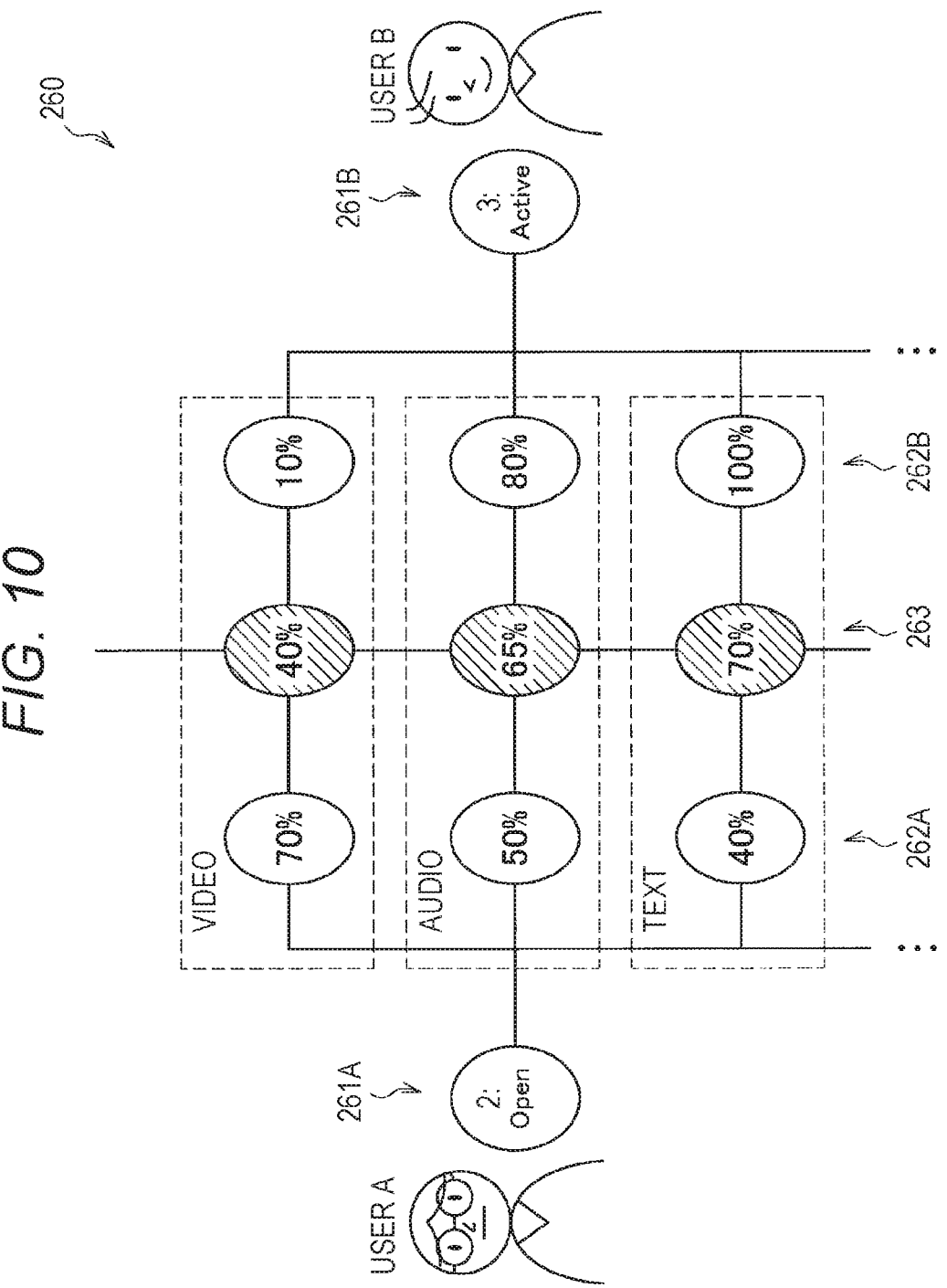
FIG. 10 is a view for describing a third display example of an adjustment parameter determination status according to the present embodiment.

FIG. 10 is a view for describing a third display example of an adjustment parameter determination status according to the present embodiment. In FIG. 10, an adjustment parameter determination status 260 includes information in which information indicating disclosure settings of a plurality of users communicating with each other (in other words, information indicating a first connection request setting and information indicating a second connection request setting) and determined adjustment parameters are listed for each item. In detail, the adjustment parameter determination status 260 includes information 261A and 261B indicating connection request levels of user A and user B. Furthermore, the adjustment parameter determination status 260 includes information 262A and 262B indicating adjustment parameters for each item such as a video, an audio, a text, and the like, corresponding to each of the connection request levels of user A and user B and information 263 indicating an adjustment parameter corrected on the basis of the information 262A and 262B. According to the information 263 indicating the corrected adjustment parameter, in space information of user A and user B, 40% of a video, 65% of an audio, and 70% of a text are mutually disclosed.

(3) Variations of Space Video Information

The space video information can be variously represented, in addition to that illustrated in FIG. 7. Examples of these representations will be described with reference to FIGS. 11 to 18. Note that the following display examples may be used in combination as appropriate.

First Display Example

FIG. 11 is a view for describing a first display example of space video information according to the present embodiment. Space video information 300 illustrated in FIG. 11 is a video in which a video 302 of the second user is arranged in a virtual three-dimensional space. In the space video information 300, the video 302 of user B is arranged in a virtual house object present at a distance in a depth direction according to an adjustment parameter. For example, in a case where an adjustment parameter having a high connectivity is determined, the video 302 of user B is arranged at a short distance, and in a case where an adjustment parameter having a low connectivity is determined, the video 302 of user B is arranged at a long distance. In a case where the video of user B is arranged at the long distance, user A feels that user B is distant from user A, such that he/she can feel that privacy is protected and feel relief. Furthermore, the information processing apparatus 10 can reduce a display size and suppress a communication amount by arranging the video 302 of user B at the long distance. Furthermore, in the space video information 300, the video 302 of user B is covered with the dome-shaped enclosure display 303, such that it is explicitly represented that an approach cannot be made any more (in other words, that a connectivity cannot be increased). Furthermore, the information processing apparatus 10 may reflect information from a communication source or a communication destination in real time or may arrange a designated object (virtual object), in this three-dimensional space. Furthermore, a scene such as a background or the like of the three-dimensional space can also be variously applied automatically or by a setting by the user. For example, it is possible to set various scenes such as a scene in a forest, a scene of a town, a scene of a space, a scene of a sea floor, and the like.

Second Display Example

Figure 12:
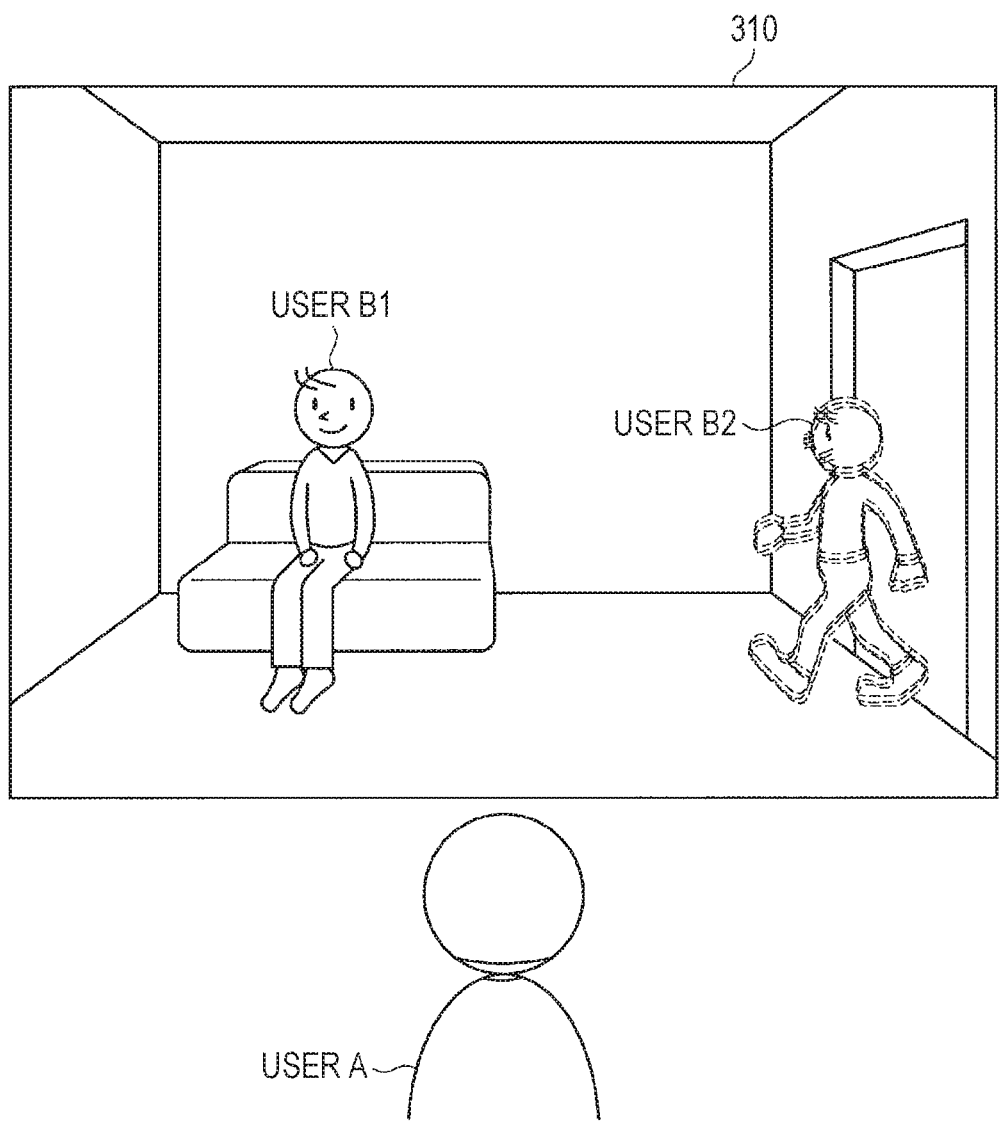
FIG. 12 is a view for describing a second display example of space video information according to the present embodiment.

FIG. 12 is a view for describing a second display example of space video information according to the present embodiment. Space video information 310 illustrated in FIG. 12 is a video in which a video of the second user is time-integrated according to an adjustment parameter. The higher the connectivity, the shorter the integration section, and the lower the connectivity, the longer the integration section. Therefore, as the connectivity becomes lower, a moving object is blurrily displayed or is displayed to disappear. In FIG. 12, a stationary user B1 is clearly displayed and a walking user B2 is blurrily displayed. As the integration section becomes longer, a frame rate of the video can be lowered, such that a communication amount is further suppressed. A length of the integration section can be flexibly set by an individual setting.

Third Display Example

Figure 13:
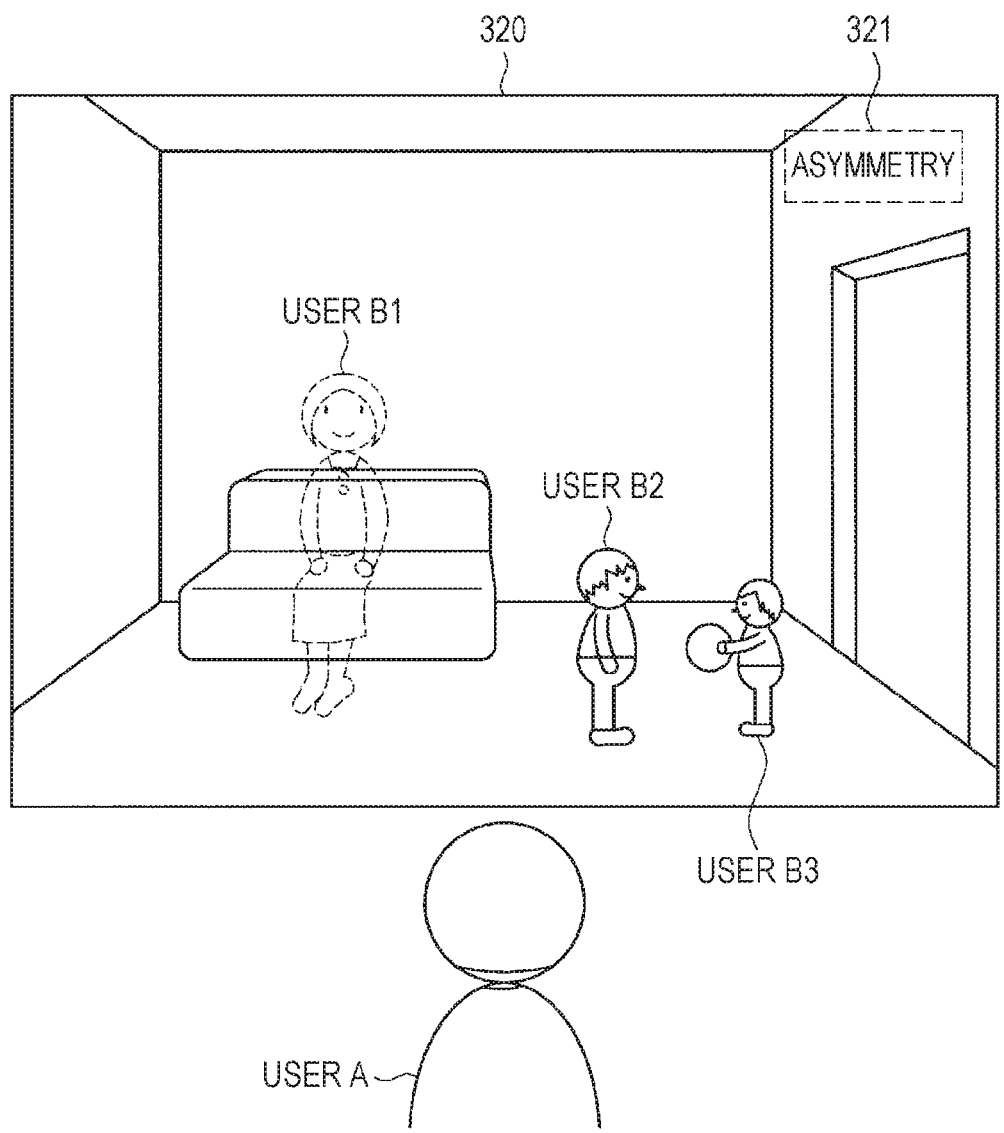
FIG. 13 is a view for describing a third display example of space video information according to the present embodiment.

FIG. 13 is a view for describing a third display example of space video information according to the present embodiment. Space video information 320 illustrated in FIG. 13 is a video in which a specific second user is erased according to an adjustment parameter, and user B1 of user B1, user B2, and user B3 present at point B is erased. For example, user A is a mother, user B1 is a daughter-in-law of user A, and users B2 and B2 are grandchildren of user A. In this case, user A receives provision of space video information without user B1 who he/she is on bad terms with by performing individual setting so as to erase user B1, and can thus obtain a pleasant connection feeling. However, in such asymmetrical display, a difference in recognition of who is present at the place between both users is generated, such that there is a possibility that an inappropriate speech will be made, which causes trouble. Therefore, in the space video information 320, information 321 indicating that the adjustment parameter is asymmetrically determined by the individual setting is displayed. With this configuration, it is possible to prevent the inappropriate speech based on the difference in the recognition. Furthermore, it is possible to suppress a communication amount by determining the adjustment parameter so as to perform transmission after erasing a video related to user B1.

Fourth Display Example

Figure 14:
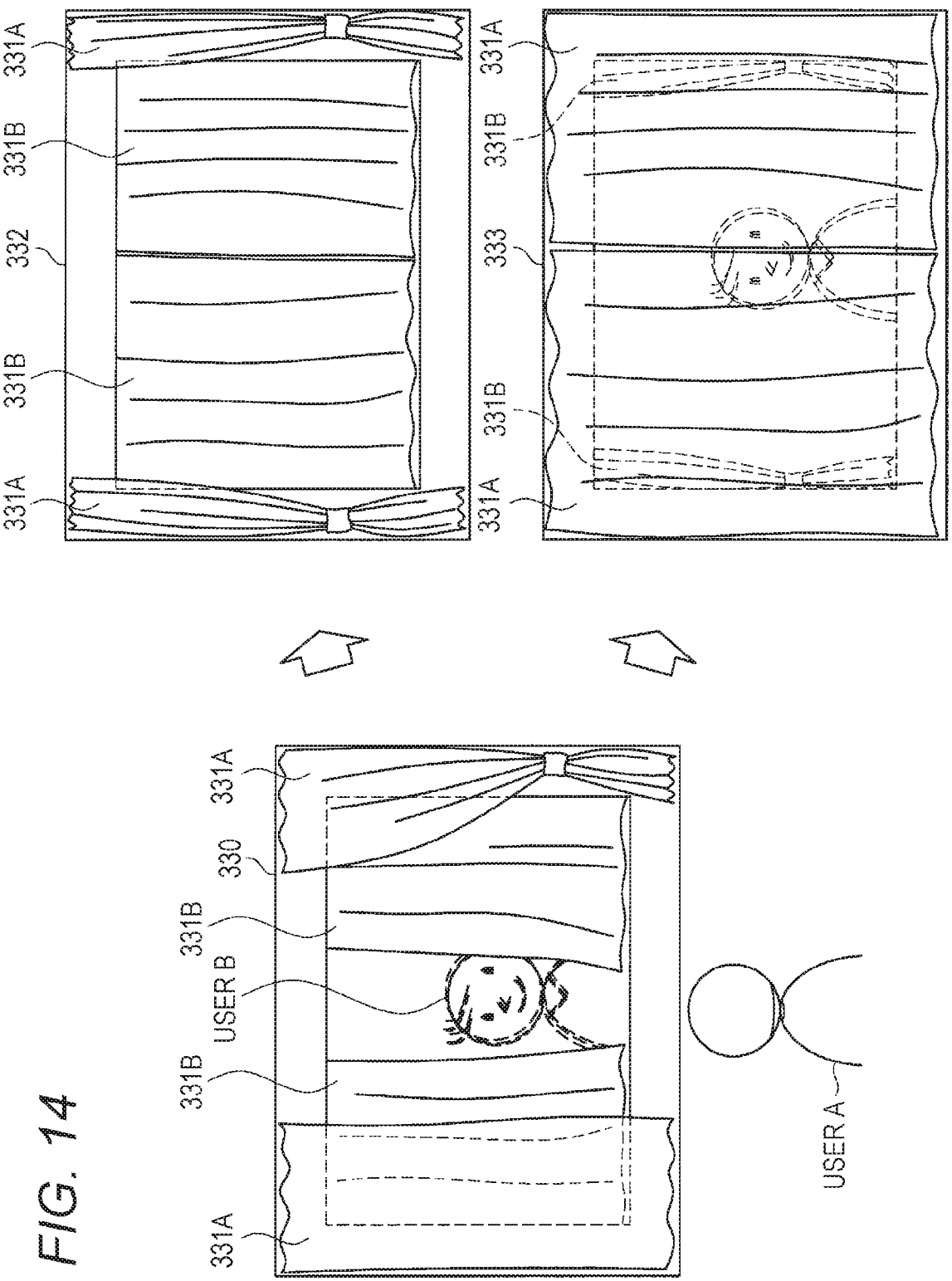
FIG. 14 is a view for describing a fourth display example of space video information according to the present embodiment.

FIG. 14 is a view for describing a fourth display example of space video information according to the present embodiment. Space video information 330 illustrated in FIG. 14 is a video in which at least a part of a video of the second user is shielded by a virtual object according to an adjustment parameter and the video of the second user is blurred. For example, the lower the connectivity, the larger the area is shielded (hidden) and the second user is strongly blurred. Note that the blur representation is realized by, for example, obscuring a contour, applying mosaic processing, or applying resolution reduction processing. Privacy of the user is protected by such shielding and blurring representation. Data corresponding to the shielded area need not to be transmitted, and a data amount to be transmitted is reduced by a reduction in a resolution, or the like, such that a communication amount is suppressed. Furthermore, as a representation for blurring the video of the second user, for example, a representation for reducing luminance of the video (effect of turning off an electric lamp to darken the video) is also possible. When describing FIG. 14 in more detail, in the space video information 330, user B is blurrily displayed across a virtual intermediate region such as a bay window. Here, in the space video information 330, a virtual curtain object 331A is displayed on a user A side, and a virtual curtain object 331B is displayed on a user B side. User A can adjust a shielding range by opening and closing the curtain object 331A. Similarly, user B can adjust a shielding range by opening and closing the curtain object 331B. In other words, each user can easily adjust a connectivity (for example, a disclosure setting) by performing an operation of opening and closing the curtain. Moreover, each user can easily recognize a connectivity of the counterpart on the basis of how the curtain is placed. Space video information 332 is displayed in a case where a connectivity of user A is high and a connectivity of user B is low, and the curtain object 331A is open and the curtain object 331B is completely closed. On the other hand, space video information 333 is displayed in a case where a connectivity of user A is low and a connectivity of user B is high, and the curtain object 331A is completely closed and the curtain object 331B is open. With such a representation, it is possible for each user to shield a video that he/she does not want to see while allowing a video that he/she does not want to show the counterpart to not be disclosed by closing the curtain and see a video that he/she wants to see while disclosing a video that he/she wants to show the counterpart by opening the curtain. Furthermore, it is possible for each user to obtain a feeling of security that he/she is not seen by reducing a feeling of presence of the user of the communication counterpart by applying the blur representation to the user of the communication counterpart.

Fifth Display Example

Space video information may be a video including a virtual human object imitating the second user. In other words, even though a video of the second user itself is not included in the space video information, for example, a video in which a three-dimensional computer graphics (3DCG) of a human corresponding to the second user reproduces a state or an operation similar to that of the second user may be provided as the space video information to the first user. The reproduction of the state or the operation of the user can be performed, for example, by combining information obtained by sensing of biological information or a motion capture technology with 3D model information of the user acquired by a depth sensor or the like and received in advance. With this configuration, it is possible to suppress a communication amount as compared with a case where the video is transmitted as it is. Furthermore, for example, a degree of imitating the second user, such as whether or not to imitate a face or a facial expression, whether or not to imitate an operation, or the like, may be adjusted according to the connectivity of the adjustment parameter.

Hereinafter, display examples in multipoint connection are provided.

Sixth Display Example

Figure 15:
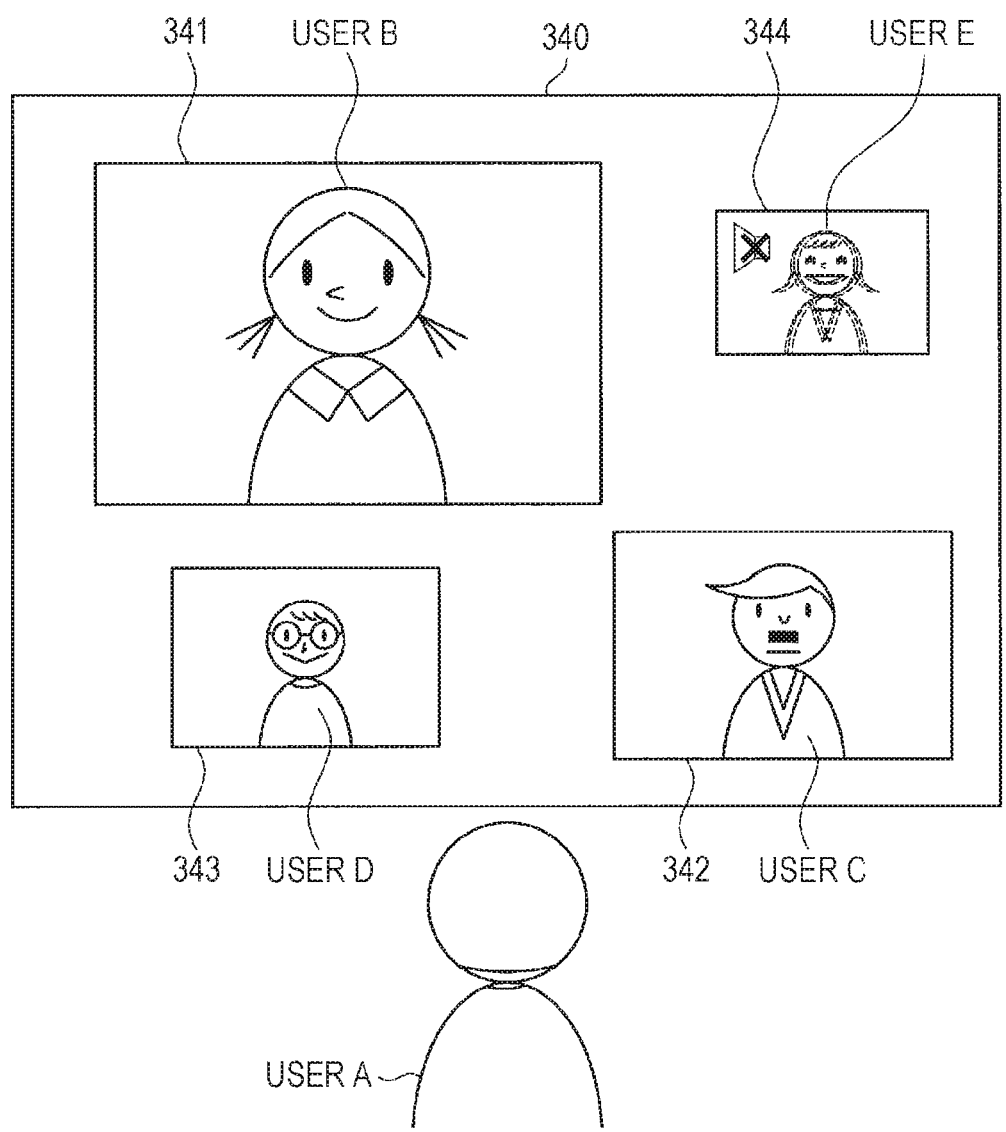
FIG. 15 is a view for describing a sixth display example of space video information according to the present embodiment.

FIG. 15 is a view for describing a sixth display example of space video information according to the present embodiment. Space video information 340 illustrated in FIG. 15 is a video including videos of a plurality of second users displayed at sizes according to adjustment parameters. For example, the higher the connectivity of a user, the larger the displayed video of the user, and the lower the connectivity of a user, the smaller the displayed video of the user. According to the space video information 340, a video 341 of user B having the highest connectivity is displayed at the largest size, a video 342 of user C having the second highest connectivity is displayed at the second largest size, a video 343 of user D having the third highest connectivity is displayed at the third largest size, and a video 344 of user E having the lowest connectivity is displayed at the smallest size. Note that an audio from user E is muted. As such, it is possible to provide pleasant connection feelings in parallel by outputting videos of multiple points in parallel and at the sizes according to the adjustment parameters.

Seventh Display Example

Figure 16:
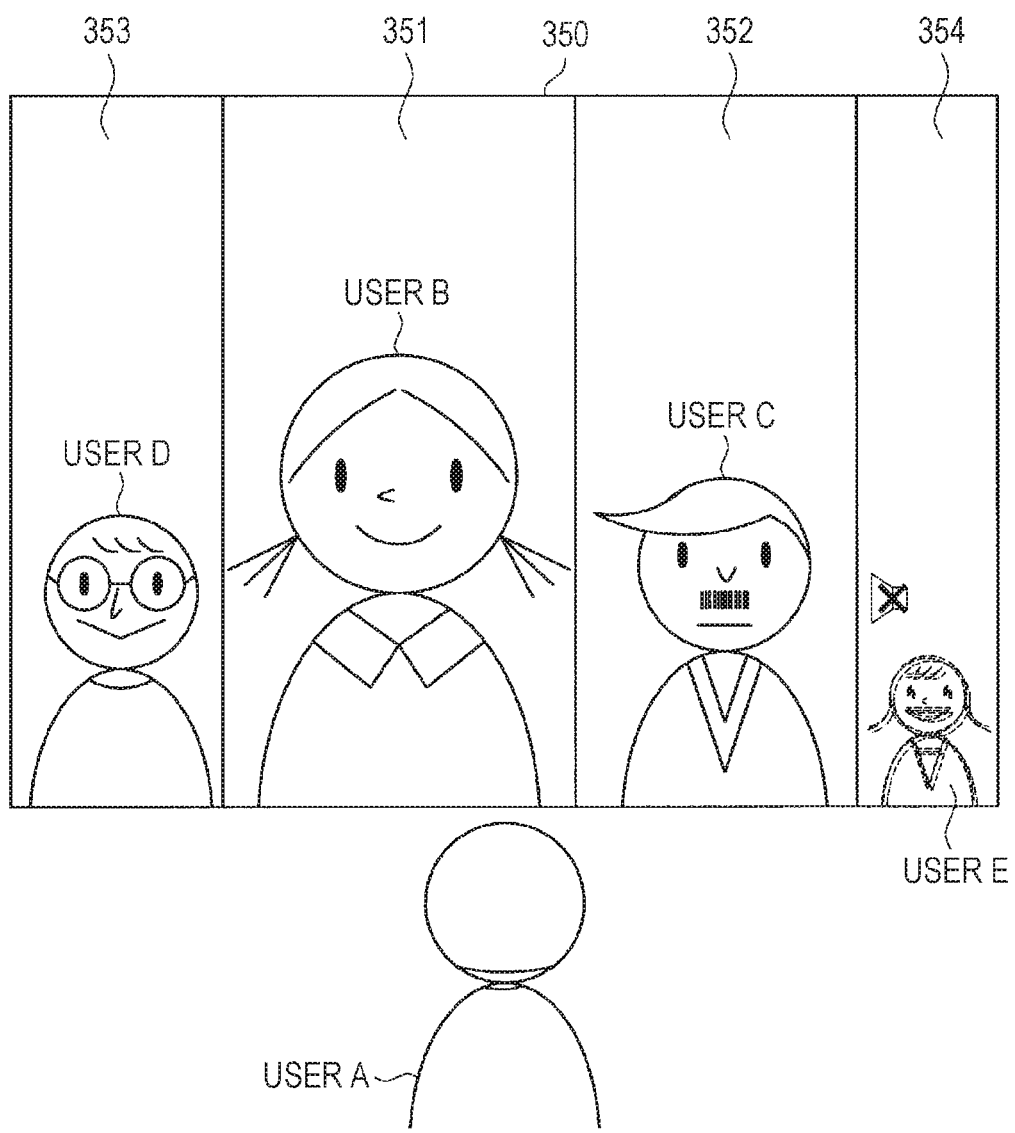
FIG. 16 is a view for describing a seventh display example of space video information according to the present embodiment.

FIG. 16 is a view for describing a seventh display example of space video information according to the present embodiment. Space video information 350 illustrated in FIG. 16 is a video including videos of a plurality of second users displayed at sizes according to adjustment parameters. For example, the higher the connectivity of a user, the larger the displayed video of the user, and the lower the connectivity of a user, the smaller the displayed video of the user. In particular, in FIG. 16, videos of a plurality of second users having full lengths in a longitudinal direction are displayed side by side in a transverse direction. The video of each second user is a video that is cut out about a face or the center of the video and compressed in the transverse direction. According to the space video information 350, a video 351 of user B having the highest connectivity is displayed at the largest size, a video 352 of user C having the second highest connectivity is displayed at the second largest size, a video 353 of user D having the third highest connectivity is displayed at the third largest size, and a video 354 of user E having the lowest connectivity is displayed at the smallest size. Note that an audio from user E is muted. As such, it is possible to provide pleasant connection feelings in parallel by outputting videos of multiple points in parallel and at the sizes according to the adjustment parameters.

Eighth Display Example

Figure 17:
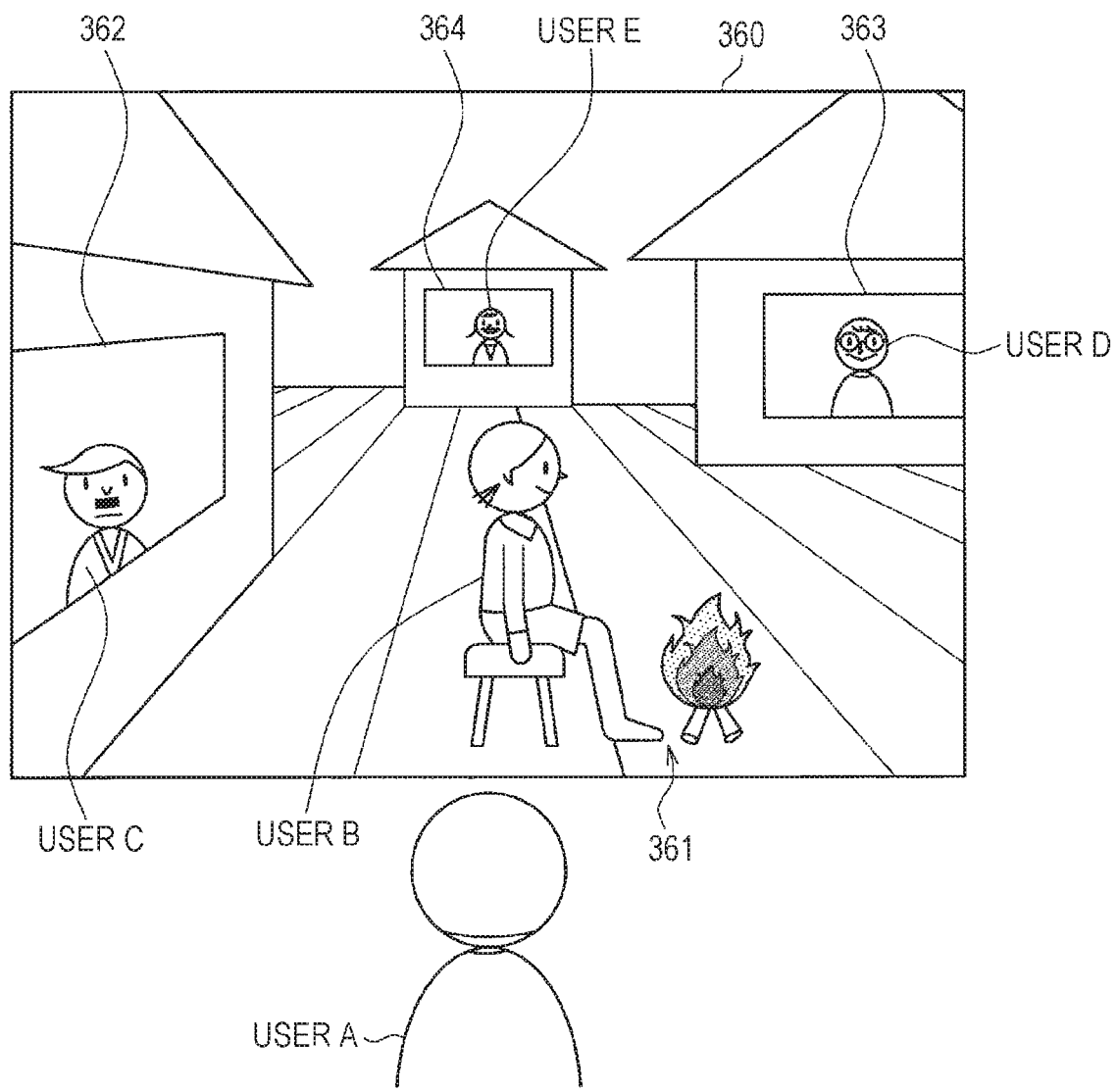
FIG. 17 is a view for describing an eighth display example of space video information according to the present embodiment.

FIG. 17 is a view for describing an eighth display example of space video information according to the present embodiment. Space video information 360 illustrated in FIG. 17 is a video in which videos 302 of a plurality of second users are arranged at distances in a depth direction according to adjustment parameters in a virtual three-dimensional space. A video 361 of user B having the highest connectivity is represented as a state in which a 3DCG of a human corresponding to user B warms himself/herself by a bonfire in a virtual three-dimensional space. With such a representation, user A can feel more affinity with user B to obtain a pleasant connection feeling. Videos 362, 363, and 364 of the other users C, D, and E are arranged in virtual house objects present at distances according to connectivities. As such, the eighth display example is an example of combining the fifth display example with the first display example while expanding the first display example to multipoint connection.

Here, distances between the respective users B, C. D, and E may correspond to connectivities with each other. In other words, distances between the videos of the plurality of second users arranged in the virtual three-dimensional space may be distances according to the adjustment parameters between the second users. In this case, videos of groups having a high connectivity with each other are gathered and displayed when viewed from user A. Therefore, the videos are arranged such that the groups having the high connectivity with each other fall within one visual field (in other words, within one screen) when viewed from user A. Then, when the virtual three-dimensional space is rotated about user A in the transverse direction, videos of other groups having a high connectivity with each other may fall within one visual field when viewed from user A.

Ninth Display Example

Figure 18:
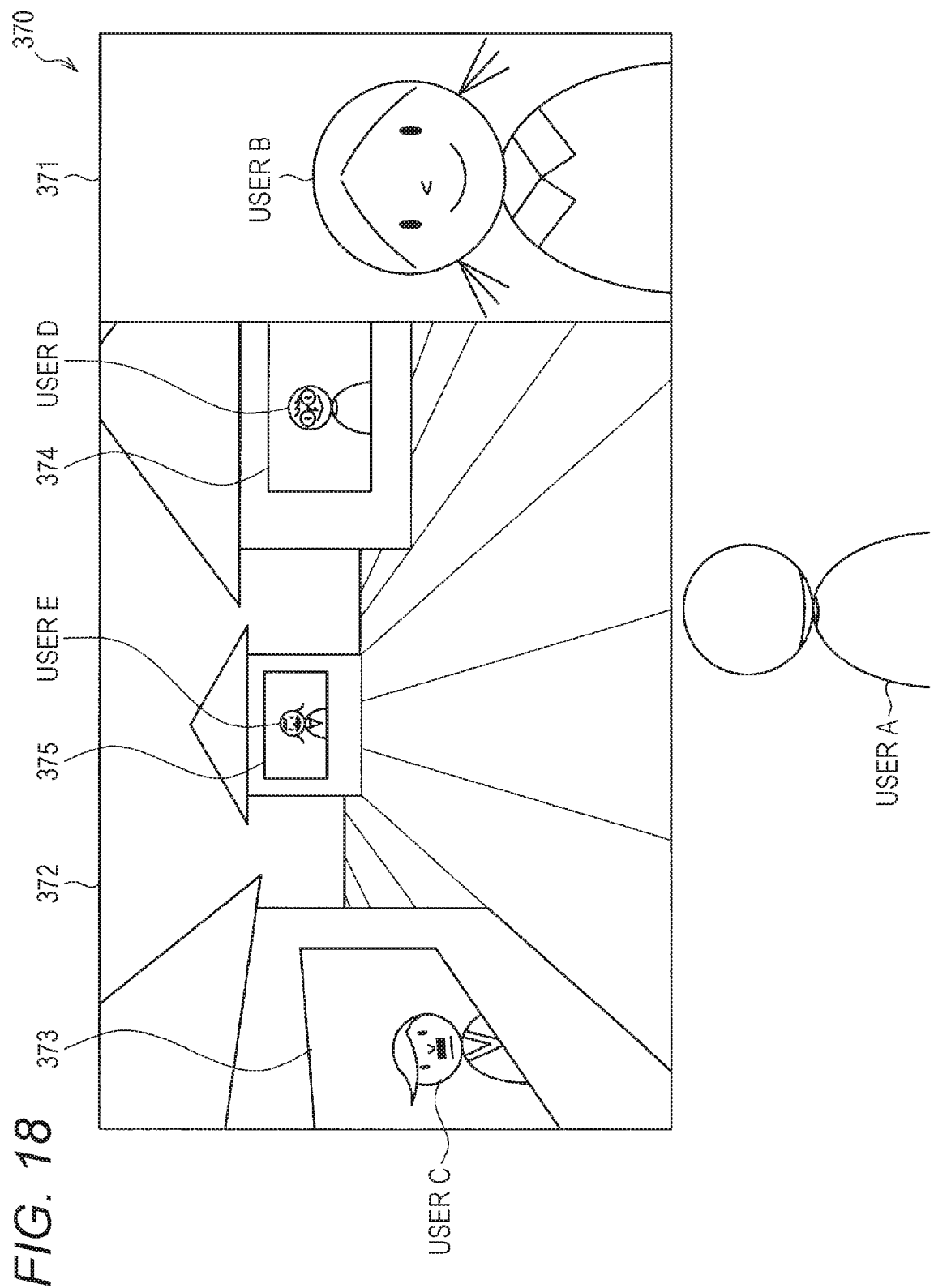
FIG. 18 is a view for describing a ninth display example of space video information according to the present embodiment.

FIG. 18 is a view for describing a ninth display example of space video information according to the present embodiment.

Space video information 370 illustrated in FIG. 18 includes a video in which a video in which videos of second users are arranged at distances in a depth direction according to adjustment parameters in a virtual three-dimensional space and a video of a second user satisfying a predetermined condition are arranged side by side. A video 371 of user B having the highest connectivity has a full length in a longitudinal direction, and is displayed side by side with a video 372 of a virtual three-dimensional space in which videos of other users are arranged. Meanwhile, in the video 372 of the virtual three-dimensional space, videos 373, 374, and 375 of users C, D and E are arranged in house objects present at distances according to connectivities. As such, the ninth display example is a combination of the first display example and the seventh display example.

<<5. Switching Processing>>

As described above, by the space connection processing by the communication system 1, users present at remote locations can sense mutual existence or states and transfer the sensed mutual existence and states to each other by a natural and physical sensation or method as if they were in the same space.

Clearness or ambiguity of the mutual existence and states is adjusted at any time by reset of the connection request setting and update of the adjustment parameter accompanying the reset. For example, when the first user approaches a short distance such as 1 m to 2 m from the second user (in more detail, the displayed space video information of the second user), the connection request level is reset to be high, such that the adjustment parameter is updated to an adjustment parameter having a high connectivity. In this case, it becomes possible for the first user to perform communication with the second user while recognizing a detailed facial expression or a physical state or operation, and the surrounding object or environment as if the second user was in front of the first user. On the other hand, when the first user becomes distant at a long distance such as 4 to 5 m from the second user, the connection request level is reset to be low, such that the adjustment parameter is updated to an adjustment parameter having a low connectivity. In this case, it becomes possible for the first user to obtain a loose connection feeling that only ambiguous existence is sensed as if the second user was distant from the first user.

It is desirable that switching of output information accompanying such update of the adjustment parameter is performed seamlessly (in other words, continuously). The reason is that when switching is performed so that the connectivity suddenly decreases, the user of the communication counterpart may feel discomfort or anxiety.

Therefore, the information processing apparatus 10 sequentially updates the adjustment parameters in a case where there has been a change in at least one of the disclosure settings of the plurality of users (for example, in a case where there has been a change in the first connection request setting or the second connection request setting). In other words, the information processing apparatus 10 stepwise changes adjustment parameters over time from an adjustment parameter determined on the basis of the connection request setting before the change to an adjustment parameter corresponding to the connection request setting after the change. For example, in a case where the user changes clothes, it is considered that the connection request level decreases at the time of the start of the change of clothes and increases at the time of the end of the change of clothes. In such a case, the information processing apparatus 10 generates and discloses space information that sequentially changes a user's clothes from clothes before the change of clothes to clothes after the change of clothes, while deleting a scene of the change of clothes of the user. Besides, the information processing apparatus 10 may perform image processing such as connecting videos before and after the switching to each other by fade, or the like. With such processing, it is possible to continuously and naturally switch the output information. With the continuous and natural switching of the output information, it is possible to cause the users not to feel that spaces connected to each other are actually present at remote locations and to cause the users to be under an illusion as if the spaces connected to each other were adjacent spaces.

Switching of the connection request setting performed on the basis of an unconscious instruction such as an operation or the like of the user also contributes to realization of natural switching. For example, it is possible to reproduce a phenomenon similar to a real space that a connectivity between the spaces is increased only by the approach of the first user to the second user.

Furthermore, the update of the adjustment parameters may be performed according to the future prediction. For example, the adjustment parameters may be updated in advance in response to a predictable event such as sunrise or sunset, office attendance of the users, or the like.

<<6. Hardware Configuration Example>>

Figure 19:
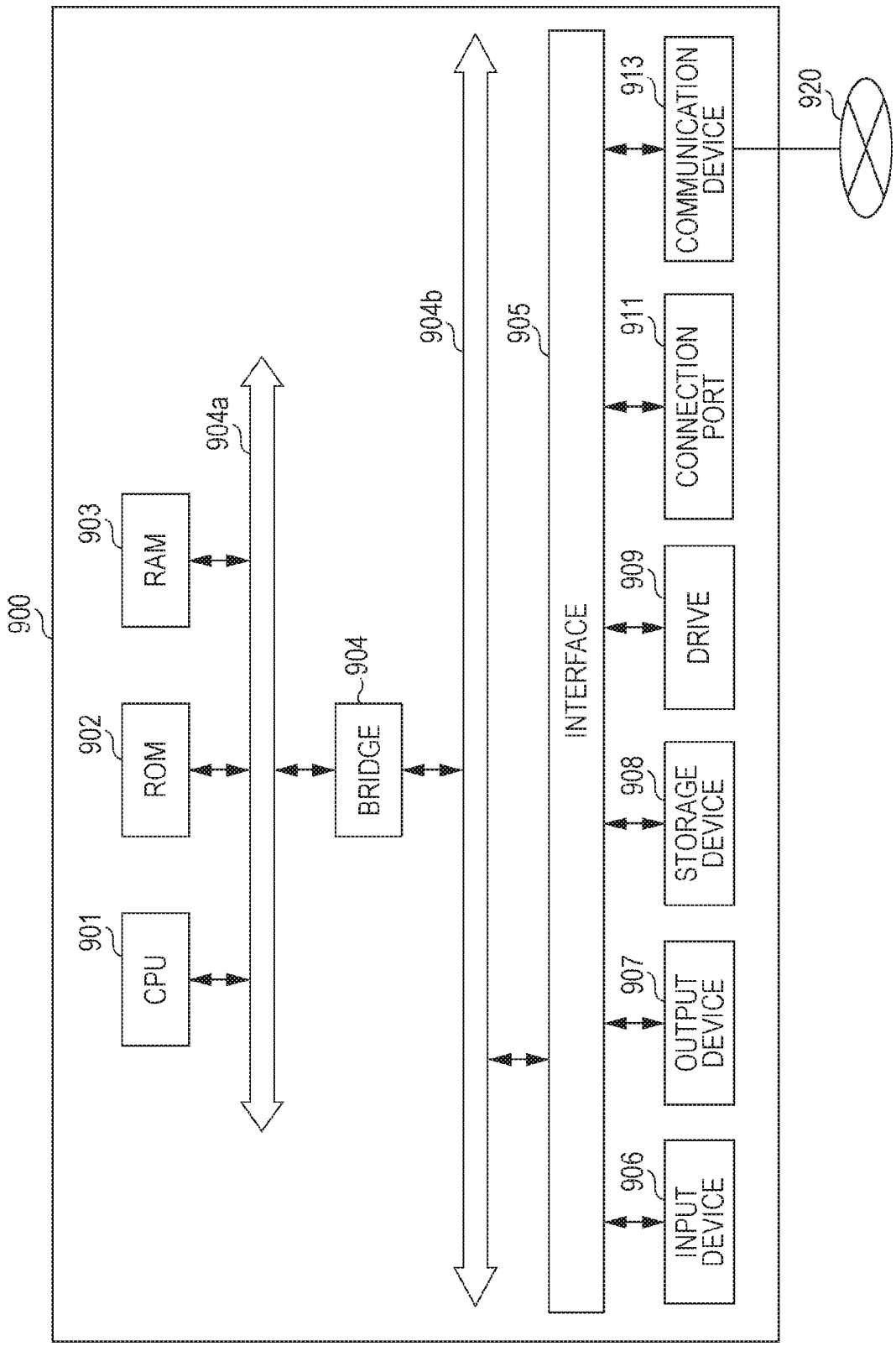
FIG. 19 is a block diagram illustrating an example of a hardware configuration of the information processing apparatus according to the present embodiment.

Finally, a hardware configuration of the information processing apparatus according to the present embodiment will be described with reference to FIG. 19. FIG. 19 is a block diagram illustrating an example of a hardware configuration of an information processing apparatus according to the present embodiment. Note that an information processing apparatus 900 illustrated in FIG. 19 can realize, for example, the information processing apparatus 10 illustrated in FIG. 3. Information processing by the information processing apparatus 10 according to the present embodiment is realized by cooperation between software and hardware as described later.

As illustrated in FIG. 19, the information processing apparatus 900 includes a central processing unit (CPU) 901, a read only memory (ROM) 902, a random access memory (RAM) 903, and a host bus 904a. Furthermore, the information processing apparatus 900 includes a bridge 904, an external bus 904b, an interface 905, an input device 906, an output device 907, a storage device 908, a drive 909, a connection port 911, and a communication device 913. The information processing apparatus 900 may have a processing circuit such as an electric circuit, a digital signal processor (DSP), an application specific integrated chip (ASIC), or the like, instead of or together with the CPU 901.

The CPU 901 functions as an arithmetic processing unit and a control unit, and generally controls an operation in the information processing apparatus 900 according to various programs. Furthermore, the CPU 901 may be a microprocessor. The ROM 902 stores programs, calculation parameters, or the like used by the CPU 901. The RAM 903 temporarily stores programs used in execution of the CPU 901, parameters appropriately changed in the execution, or the like. The CPU 901 can form, for example, the control unit 150 illustrated in FIG. 3.

The CPU 901, the ROM 902, and the RAM 903 are connected to each other by the host bus 904a including a CPU bus or the like. The host bus 904a is connected to the external bus 904b such as a peripheral component interconnect/interface (PCI) bus or the like through the bridge 904. Note that the host bus 904a, the bridge 904, and the external bus 904b do not necessarily need to be separately configured, and functions of the host bus 904a, the bridge 904, and the external bus 904b may be implemented on a single bus.

The input device 906 is realized by, for example, a device such as a mouse, a keyboard, a touch panel, a button, a microphone, a switch, a lever, or the like, to which information is input by a user. Furthermore, the input device 906 may be, for example, a remote control device using infrared rays or other electric waves, or may be an external connection device such as a mobile phone, a personal digital assistants (PDA) or the like corresponding to an operation of the information processing apparatus 900. Moreover, the input device 906 may include, for example, an input control circuit that generates an input signal on the basis of the information input by the user using the input means and outputs the generated input signal to the CPU 901. The user of the information processing apparatus 900 can input various data to the information processing apparatus 900 and instruct the information processing apparatus 900 to perform a processing operation by operating the input device 906.

Besides, the input device 906 can be a device that detects information regarding the user. For example, the input device 906 can include various sensors such as an image sensor (for example, a camera), a depth sensor (for example, a stereo camera), an acceleration sensor, a gyro sensor, a geomagnetic sensor, an optical sensor, a sound sensor, a distance sensor, a force sensor, and the like. Furthermore, the input device 906 may acquire information regarding a state of the information processing apparatus 900 itself, such as an attitude, a movement speed or the like of the information processing apparatus 900 or information regarding the surrounding environment of the information processing apparatus 900, such as brightness, noise or the like around the information processing apparatus 900. Furthermore, the input device 906 may include a global navigation satellite system (GNSS) module that receives a GNSS signal from a GNSS satellite (for example, a global positioning system (GPS) signal from a GPS satellite) and measures position information including a latitude, a longitude, and an altitude of the information processing apparatus. Furthermore, regarding the position information, the input device 906 may detect a position by transmission/reception with, for example, Wi-Fi (registered trademark), a mobile phone, a personal handy-phone system (PHS), a smartphone, or the like, or short range communication or the like. The input device 906 can form, for example, the input unit 110 illustrated in FIG. 3.

The output device 907 is a device that can visually or auditorily notify the user of the acquired information. Such a device includes display devices such as a cathode ray tube (CRT) display device, a liquid crystal display device, a plasma display device, an electroluminescence (EL) display device, a laser projector, a light emitting diode (LED) projector, a lamp and the like, audio output devices such as a speaker, a headphone and the like, printer devices, or the like. The output device 907 outputs, for example, results obtained by various types of processing performed by the information processing apparatus 900. Specifically, the display device visually displays the results obtained by the various types of processing performed by the information processing apparatus 900 in various formats such as a text, an image, a table, a graph, and the like. On the other hand, an audio output device converts an audio signal including reproduced audio data, acoustic data, or the like into an analog signal and auditorily outputs the analog signal. The output device 907 can form, for example, the output unit 120 illustrated in FIG. 3.

The storage device 908 is a device for data storage formed as an example of a storage unit of the information processing apparatus 900. The storage device 908 is realized by, for example, a magnetic storage unit device such as a hard disk drive (HDD), a semiconductor storage device, an optical storage device, a magneto-optical storage device, or the like. The storage device 908 may include a storage medium, a recording device recording data in the storage medium, a reading device reading data from the storage medium, a deleting device deleting data recorded in the storage medium, and the like. The storage device 908 stores programs executed by the CPU 901 or various data, various data acquired from the outside, and the like. The storage device 908 can form, for example, the storage unit 140 illustrated in FIG. 3.

The drive 909 is a reader/writer for the storage medium, and is embedded in or externally mounted on the information processing apparatus 900. The drive 909 reads information recorded in a removable storage medium such as a mounted magnetic disk, an optical disk, a magneto-optical disk, a semiconductor memory, or the like and outputs the read information to the RAM 903. Furthermore, the drive 909 can write information to the removable storage medium.

The connection port 911 is an interface connected to an external device, and is a connection port to an external device capable of transmitting data by, for example, a universal serial bus (USB) or the like.

The communication device 913 is, for example, a communication interface including a communication device or the like for being connected to a network 920. The communication device 913 is, for example, a communication card or the like for wired or wireless local area network (LAN), long term evolution (LTE), Bluetooth (registered trademark), or wireless universal serial bus (WUSB). Furthermore, the communication device 913 may be a router for optical communication, a router for asymmetric digital subscriber line (ADSL), modems for various types of communications, or the like. The communication device 913 can transmit and receive a signal or the like according to a predetermined protocol such as, for example, transmission control protocol/Internet protocol (TCP/IP) or the like, for example, to or from the Internet or another communication device. The communication device 913 can form, for example, the communication unit 130 illustrated in FIG. 3.

Note that the network 920 is a wired or wireless transmission path of information transmitted from a device connected to the network 920. For example, the network 920 may include a public network such as the Internet, a telephone network, a satellite communication network or the like, various local area networks (LANs) including Ethernet (registered trademark), a wide area network (WAN), or the like. Furthermore, the network 920 may include a dedicated line network such as the Internet protocol-virtual private network (IP-VPN) or the like.

Hereinabove, an example of the hardware configuration capable of realizing the function of the information processing apparatus 900 according to the present embodiment has been described. Each component described above may be realized using a general-purpose member or may be realized by hardware specialized for the function of each component. Therefore, it is possible to change the hardware configuration to be used as appropriate according to a technical level of the time of carrying out the present embodiment.

Note that a computer program for realizing each function of the information processing apparatus 900 according to the present embodiment as described above can be created and implemented in a personal computer (PC) or the like. Furthermore, a computer readable recording medium in which such a computer program is stored can be provided. The computer readable recording medium is, for example, a magnetic disk, an optical disk, a magneto-optical disk, a flash memory or the like. Furthermore, the computer program described above may be distributed through, for example, a network without using the computer readable recording medium.

<<7. Summary>>

Hereinabove, the embodiment of the present disclosure has been described in detail with reference to FIGS. 1 to 19. As described above, the information processing apparatus 10 determines the adjustment parameters of the space information asymmetrically with respect to bidirectional disclosure between the plurality of users on the basis of the disclosure settings of the space information regarding each of the plurality of users communicating with each other. Then, the information processing apparatus 10 outputs output information including the space information regarding the user of the communication counterpart processed on the basis of the adjustment parameter and the information indicating the determination reason of the adjustment parameter to the user. By asymmetrically determining the adjustment parameters, it becomes possible to provide a space connection service according to a request of both of the connected users such as that the user wants to show the user of the communication counterpart information/does not want to show the user of the communication counterpart information/wants to see information/does not want to see information, such that it becomes possible to provide a pleasant connection feeling between both of the connected user. Moreover, by outputting the information indicating the determination reason of the adjustment parameter, the user can confirm that his/her desire is reflected to have a feeling of satisfaction and a feeling of security for an adjustment result.

Hereinabove, the preferred embodiments of the present disclosure have been described in detail with reference to the accompanying drawings, but the technical scope of the present disclosure is not limited to such embodiments. It will be apparent to those skilled in the art of the present disclosure that various modifications or alterations can be conceived within the scope of the technical idea described in the claims, and it is naturally understood that these modifications or alterations also fall within the technical scope of the present disclosure.

For example, an example which the output information is output by the display device such as the display, the projector or the like has been described in the above embodiment, but the present technology is not limited to such an example. For example, the output information may be displayed by a display unit provided in an information processing terminal or may be displayed by a display unit of a transmissive or non-transmissive head mounted display (HMD).

Furthermore, a case where various types of processing for providing the space connection service are performed by the information processing apparatus 10 has been described in the above embodiment, but the present technology is not limited to such an example. For example, some or all of various types of processing for providing the space connection service may be performed in the processing server 30. For example, some or all of the setting unit 151, the determination unit 153, or the output control unit 155 may be included in the processing server 30.

Furthermore, the processing described using the flowchart and the sequence diagram in the present specification may not necessarily be performed in the illustrated order. Several processing steps may be performed in parallel. Furthermore, additional processing steps may be adopted and some processing steps may be omitted.

Furthermore, the effects described in the present specification are only illustrative or exemplary rather than being restrictive. That is, the technology according to the present disclosure can accomplish other effects apparent to those skilled in the art from the description of the present specification, in addition to or instead of the effects described above.

Note that the following configurations also fall within the technical scope of the present disclosure.

(1)
An information processing apparatus including:
a determination unit that determines adjustment parameters of space information asymmetrically with respect to bidirectional disclosure between a plurality of users communicating with each other on the basis of disclosure settings of the space information regarding each of the plurality of users; and
an output control unit that outputs output information to the user, the output information including the space information regarding a user of a communication counterpart processed on the basis of the adjustment parameters and information indicating determination reasons of the adjustment parameters.

(2)
The information processing apparatus according to the above (1), in which the information indicating the determination reasons of the adjustment parameters includes information indicating disclosure settings of the plurality of users and information indicating the determined adjustment parameters.

(3)
The information processing apparatus according to the above (2), in which the information indicating the determination reasons of the adjustment parameters is information in which the information indicating the disclosure settings of the plurality of users and the information indicating the adjustment parameters are represented by a graph.

(4)
The information processing apparatus according to the above (2), in which the information indicating the determination reasons of the adjustment parameters is information in which the information indicating the disclosure settings of the plurality of users and the information indicating the adjustment parameters are mapped to a two-dimensional plane.

(5)
The information processing apparatus according to the above (2), in which the information indicating the determination reasons of the adjustment parameters includes information in which the information indicating the disclosure settings of the plurality of users and the adjustment parameters are listed for each item.

(6)
The information processing apparatus according to any one of the above (1) to (5), in which the output information includes information indicating that the adjustment parameters are asymmetrically determined.

(7)
The information processing apparatus according to any one of the above (1) to (6), in which the output control unit outputs, to the user, space information regarding the user processed on the basis of the adjustment parameters and transmitted to the user of the communication counterpart.

(8)
The information processing apparatus according to any one of the above (1) to (7), in which the output control unit sequentially updates the adjustment parameters in a case where there has been a change in at least one of the disclosure settings of the plurality of users.

(9)
The information processing apparatus according to any one of the above (1) to (8), in which the output information includes a video in which a video of the user of the communication counterpart is arranged at a distance in a depth direction according to the adjustment parameter in a virtual three-dimensional space.

(10)
The information processing apparatus according to the above (9), in which a distance between videos of users of a plurality of the communication counterparts arranged in the virtual three-dimensional space is a distance according to the adjustment parameter between the users of the communication counterparts.

(11)
The information processing apparatus according to any one of the above (1) to (10), in which the output information includes a video in which a video of the user of the communication counterpart is time-integrated according to the adjustment parameter.

(12)
The information processing apparatus according to any one of the above (1) to (11), in which the output information includes a video in which a user of a specific communication counterpart is erased according to the adjustment parameter.

(13)
The information processing apparatus according to any one of the above (1) to (12), in which the output information includes a video in which a part of a video of the user of the communication counterpart is shielded by a virtual object according to the adjustment parameter.

(14)

The information processing apparatus according to any one of the above (1) to (13), in which the output information includes a video in which the user of the communication counterpart is blurred according to the adjustment parameter.

(15)

The information processing apparatus according to any one of the above (1) to (14), in which the output information includes a video including a virtual human object imitating the user of the communication counterpart.

(16)

The information processing apparatus according to any one of the above (1) to (15), in which the output information includes videos of users of a plurality of the communication counterparts displayed at sizes according to the adjustment parameters.

(17)

The information processing apparatus according to any one of the above (1) to (16), in which the determination unit determines the adjustment parameters on the basis of output settings of the space information regarding each of the plurality of users communicating with each other.

(18)

An information processing method including:

determining adjustment parameters of space information asymmetrically with respect to bidirectional disclosure between a plurality of users communicating with each other on the basis of disclosure settings of the space information regarding each of the plurality of users: and outputting output information to the user by an output device, the output information including the space information regarding a user of a communication counterpart processed on the basis of the adjustment parameters and information indicating determination reasons of the adjustment parameters.

(19)

A recording medium in which a program is recorded, the program for causing a computer to function as:

a determination unit that determines adjustment parameters of space information asymmetrically with respect to bidirectional disclosure between a plurality of users communicating with each other on the basis of disclosure settings of the space information regarding each of the plurality of users; and an output control unit that outputs output information to the user, the output information including the space information regarding a user of a communication counterpart processed on the basis of the adjustment parameters and information indicating determination reasons of the adjustment parameters.

REFERENCE SIGNS LIST

1 Communication system
10 Information processing apparatus
20 Network
30 Processing server
110 Input unit
120 Output unit
130 Communication unit
140 Storage unit
150 Control unit
151 Setting unit
153 Determination unit
155 Output control unit

The invention claimed is:

1. An information processing apparatus comprising:
circuitry configured to
determine adjustment parameters of space information asymmetrically with respect to bidirectional disclosure between a plurality of users communicating with each other on a basis of disclosure settings of the space information regarding each of the plurality of users; and
display output information to the user, the output information including the space information regarding a user of a communication counterpart processed on a basis of the adjustment parameters and information indicating determination reasons of the adjustment parameters, the information indicating the determination reasons of the adjustment parameters including information indicating disclosure settings of the plurality of users and information indicating the determined adjustment parameters, which is represented by a graph or mapped to a two-dimensional plane.

2. The information processing apparatus according to claim 1, wherein the information indicating the determination reasons of the adjustment parameters includes information in which the information indicating the disclosure settings of the plurality of users and the adjustment parameters are listed for each item.

3. The information processing apparatus according to claim 1, wherein the output information includes information indicating that the adjustment parameters are asymmetrically determined.

4. The information processing apparatus according to claim 1, wherein the circuitry outputs, to the user, space information regarding the user processed on a basis of the adjustment parameters and transmitted to the user of the communication counterpart.

5. The information processing apparatus according to claim 1, wherein the circuitry sequentially updates the adjustment parameters in a case where there has been a change in ai least one of the disclosure settings of the plurality of users.

6. The information processing apparatus according to claim 1, wherein the output information includes a video in which a video of the user of the communication counterpart is arranged at a distance in a depth direction according to the adjustment parameter in a virtual three-dimensional space.

7. The information processing apparatus according to claim 6, wherein a distance between videos of users of a plurality of the communication counterparts arranged in the virtual three-dimensional space is a distance according to the adjustment parameter between the users of the communication counterparts.

8. An information processing apparatus comprising:
circuitry configured to
determine adjustment parameters of space information asymmetrically with respect to bidirectional disclosure between a plurality of users communicating with each other on a basis of disclosure settings of the space information regarding each of the plurality of users; and
display output information to the user, the output information including the space information regarding a user of a communication counterpart processed on a basis of the adjustment parameters, information indicating determination reasons of the adjustment parameters, and video information, the video information including a video of the user of the communication counterpart is time-integrated according to the adjustment parameter, so that amount of the video information is reduced for moving object based on the adjustment parameter, when the video of the user of the communication counterpart is processed.

9. The information processing apparatus according to claim 8, wherein the output information includes video information in which a part of a video of the user of the communication counterpart is shielded by a virtual object according to the adjustment parameter.

10. The information processing apparatus according to claim 8, wherein the output information includes video information in which the user of the communication counterpart is blurred in a display according to the adjustment parameter.

11. The information processing apparatus according to claim 8, wherein the output information includes video information including a virtual human object imitating the user of the communication counterpart.

12. The information processing apparatus according to claim 8, wherein the output information includes video information in which videos of users of a plurality of the communication counterparts are displayed at sizes according to the adjustment parameters.

13. The information processing apparatus according to claim 8, wherein the circuitry determines the adjustment parameters on a basis of output settings of the space information regarding each of the plurality of users communicating with each other.

14. A non-transitory computer-readable storage medium including computer executable instructions, wherein the instructions, when executed by an information processing apparatus, cause the information processing apparatus to perform a method, the method comprising:

determine adjustment parameters of space information asymmetrically with respect to bidirectional disclosure between a plurality of users communicating with each other on a basis of disclosure settings of the space information regarding each of the plurality of users; and display output information to the user, the output information including the space information regarding a user of a communication counterpart processed on a basis of the adjustment parameters and information indicating determination reasons of the adjustment parameters, the information indicating the determination reasons of the adjustment parameters including information indicating disclosure settings of the plurality of users and information indicating the determined adjustment parameters, which is represented by a graph or mapped to a two-dimensional plane.

15. The information processing apparatus according to claim 8, wherein the output information includes video information in which a user of a specific communication counterpart is erased from a display according to the adjustment parameter.

16. The information processing apparatus according to claim 8, wherein the information indicating the determination reasons of the adjustment parameters includes information indicating disclosure settings of the plurality of users and information indicating the determined adjustment parameters.

17. The information processing apparatus according to claim 8, wherein the information indicating the determination reasons of the adjustment parameters includes information in which the information indicating the disclosure settings of the plurality of users and the adjustment parameters are listed for each item.

18. The information processing apparatus according to claim 8, wherein the output information includes information indicating that the adjustment parameters are asymmetrically determined.

19. The information processing apparatus according to claim 8, wherein the circuitry outputs, to the user, space information regarding the user processed on a basis of the adjustment parameters and transmitted to the user of the communication counterpart.

20. A The information processing apparatus according to claim 8, wherein the circuitry sequentially updates the adjustment parameters in a case where there has been a change in ai least one of the disclosure settings of the plurality of users.

* * * * *